United States Patent [19]

Ichihara et al.

[11] Patent Number: 5,412,627
[45] Date of Patent: May 2, 1995

[54] A MAGNETO-OPTICAL RECORDING SYSTEM INCLUDING A RECORDING MEDIUM HAVING A REVERSAL PREVENTIVE LAYER FOR PREVENTING A MAGNETIZATION REVERSAL OF A BIAS LAYER WHICH IS MAGNETOSTATICALLY COUPLED TO A RECORDING LAYER

[75] Inventors: Katsutaro Ichihara, Yokohama; Sumio Ashida, Tokyo; Akira Kikitsu, Yokohama; Yumi Mizusawa, Tokyo, all of Japan

[73] Assignee: Kabushiki Kaisha Toshiba, Kawasaki, Japan

[21] Appl. No.: 61,538

[22] Filed: May 14, 1993

Related U.S. Application Data

[63] Continuation of Ser. No. 648,821, Jan. 31, 1991, abandoned.

[30] Foreign Application Priority Data

Jan. 31, 1990 [JP] Japan ............................. 2-19277
Mar. 8, 1990 [JP] Japan ............................. 2-54874

[51] Int. Cl.⁶ ............................................. G11B 13/04
[52] U.S. Cl. ......................................... 369/13; 360/59
[58] Field of Search .................. 369/13; 360/59, 114; 365/122

[56] References Cited

U.S. PATENT DOCUMENTS

| | | | |
|---|---|---|---|
| 4,649,519 | 3/1987 | Sun et al. | 365/122 |
| 4,794,560 | 12/1988 | Bell et al. | 360/59 |
| 4,955,007 | 9/1990 | Aratami et al. | 360/59 |
| 5,087,532 | 2/1992 | Challener, IV | 428/900 |
| 5,105,400 | 4/1992 | Kikitsu et al. | 369/13 |

FOREIGN PATENT DOCUMENTS

| | | |
|---|---|---|
| 0217096 | 4/1987 | European Pat. Off. |
| 0258978 | 3/1988 | European Pat. Off. |
| 0333462 | 9/1989 | European Pat. Off. |
| 0348198 | 12/1989 | European Pat. Off. |
| 62-175948 | 8/1987 | Japan |

OTHER PUBLICATIONS

IBM Technical Disclosure Bulletin, vol. 32, No. 4A, pp. 384–386, Sep. 1989, "Thermomagnetic Recording Medium for a Direct-Overwrite Recording System".

Applied Physics Letter, vol. 52, No. 18, pp. 1537–1539, D. Rugar, et al, May 2, 1988, "Thermomagnetic Direct Overwrite in TbFe Using Thermally Induced Domain Wall Energy Gradient".

*Primary Examiner*—Hoa T. Nguyen
*Attorney, Agent, or Firm*—Oblon, Spivak, McClelland, Maier, & Neustadt

[57] ABSTRACT

Light beams having two different power levels are radiated on a magneto-optical medium having a recording layer and a bias layer magnetostatically coupled to the recording layer, thereby recording and erasing information. Upon radiation of a high level beam, a beam irradiated portion of the recording layer is heated to reach a magnetization reversal temperature, and the direction of magnetization of the irradiated portion follows a direction of a leakage field generated by a magnetization distribution formed by heating of the bias layer. Upon radiation of a low level beam, a beam irradiated portion of the recording layer is heated to reach a magnetization reversal temperature to cause the bias layer to generate a leakage field having a magnitude smaller than that upon radiation of the high level beam. In this case, the direction of magnetization of the recording layer is opposite to that of the leakage field obtained upon radiation of the high level beam. The directions of magnetization of the bias layer are kept unchanged before and after the radiation of the high level beam and before and after the radiation of the low level beam.

6 Claims, 13 Drawing Sheets

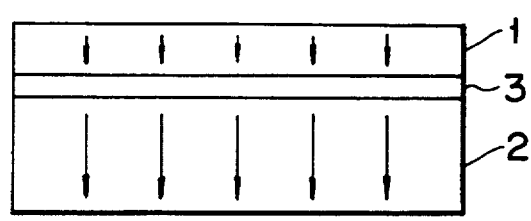
F I G. 1
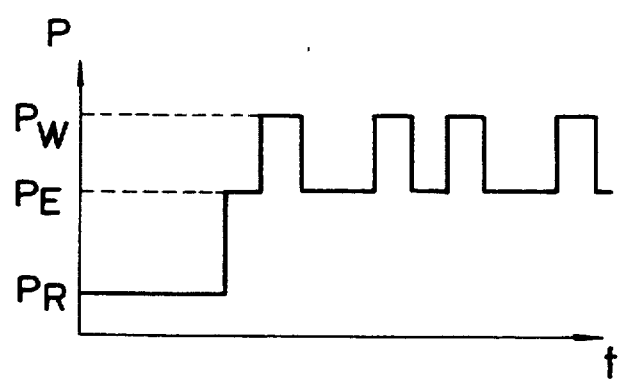
F I G. 2

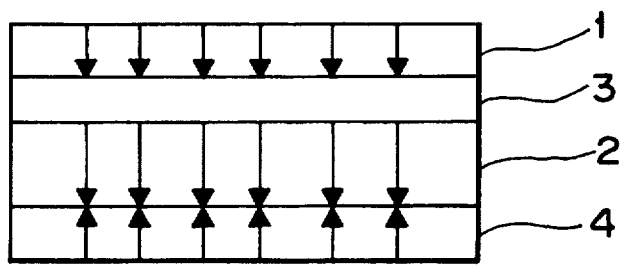
F I G. 4
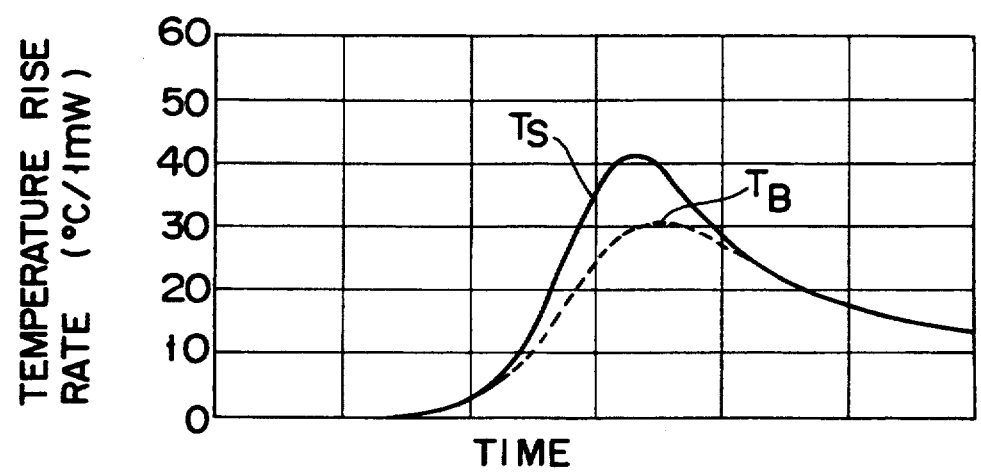
F I G. 5

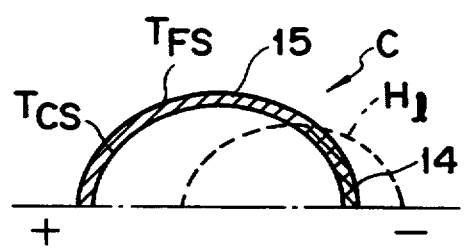
F I G. 14A
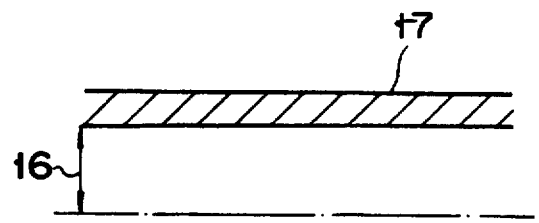
F I G. 14B
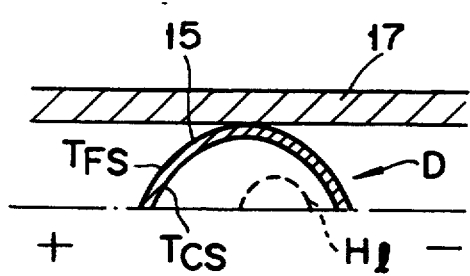
F I G. 15A
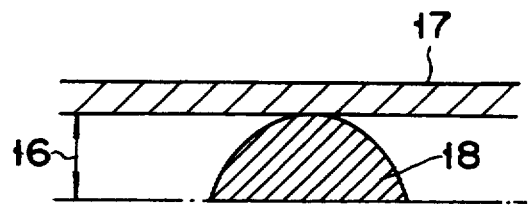
F I G. 15B

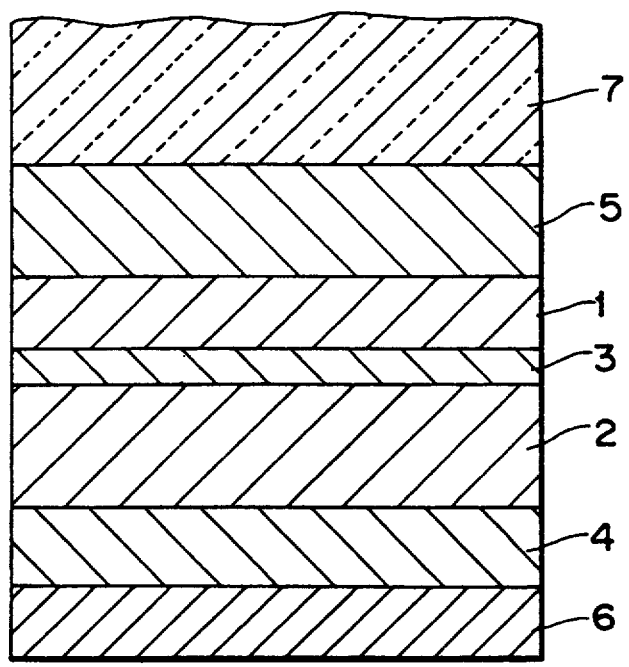
F I G. 16

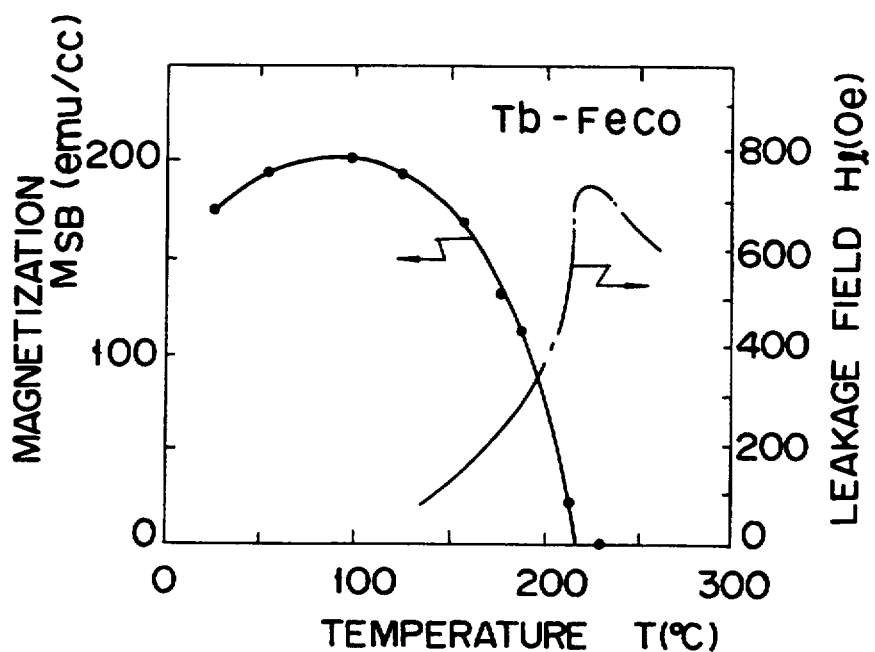
F I G. 17
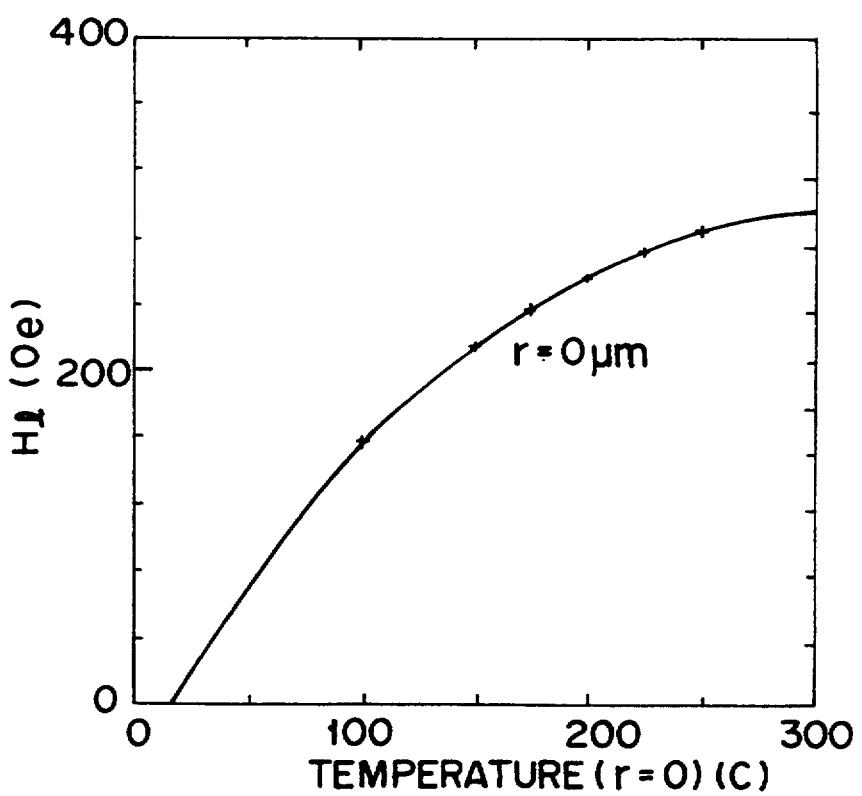
F I G. 18

A MAGNETO-OPTICAL RECORDING SYSTEM INCLUDING A RECORDING MEDIUM HAVING A REVERSAL PREVENTIVE LAYER FOR PREVENTING A MAGNETIZATION REVERSAL OF A BIAS LAYER WHICH IS MAGNETOSTATICALLY COUPLED TO A RECORDING LAYER

This application is a Continuation of application Ser. No. 07/648,821, filed on Jan. 31, 1991, now abandoned.

BACKGROUND OF THE INVENTION

1. Field of the Invention

The present invention relates to a magneto-optical recording method for performing recording or erasure of information upon radiation of a light beam on a magneto-optical recording medium, and a magneto-optical recording medium used in this method.

2. Description of the Related Art

A magneto-optical recording technique for recording, reproducing, or erasing information upon radiation of a laser beam on a magneto-optical recording medium has been used in practical applications and is the most promising technique as a memory technique having both features of an optical recording technique (e.g., high-density recording characteristics and compatibility among recording media) and data rewritability of a magnetic recording technique. According to an existing practical magneto-optical recording method, a laser pulse beam modulated with data is focused and radiated on a recording layer, a coercive force of the heated portion is decreased below an externally applied magnetic field, and a direction of a magnetization of this area is changed to the direction of the externally applied magnetic field, thereby recording data. In order to rewrite data, a magnetic field is externally applied to the recording layer in a direction opposite to that in the recording mode to irradiate the recording layer with a continuous laser beam, thereby erasing the data. Thereafter, new data is written in the recording layer upon radiating laser pulse modulated corresponding new data. A disk memory requires two revolutions and switching the magnetic field at the time of data rewriting. As compared with a magnetic disk memory operated at the same speed, a rewriting speed is undesirably decreased less than ½, thus resulting in an essential drawback.

In recent years, various types of so-called overwriting methods for updating data in magneto-optical recording by one revolution as in magnetic recording are proposed. These conventional overwrite techniques are classified into a magnetic field modulation scheme and a light power modulation scheme.

The former scheme is to modulate an external magnetic field at high speed and to overwrite data in the same manner as in magnetic recording, as disclosed in Jap. J. Appl, Phys. Vol. 26, Suppl. 26-4, PP. 149–154, 1987 and IEEE Trans. Magn., Vol. 24, No. 1, PP. 666–669, 1988. This technique, however, has disadvantages in that a disk obtained by adhering two substrates is difficult to use, and compatibility with commercially available rewritable optical disks is difficult to establish. In addition, it is difficult to simultaneously achieve low power consumption and high transfer rate.

The latter technique is to change a light intensity or irradiation duration to overwrite data, as disclosed in Published Japanese Unexamined Patent Application No. 62-175949 and Appl. Phys. Lett., Vol. 52, No. 18, PP. 1,537–1,539, 1988. In this technique, however, control is complicated, and a compact apparatus is difficult to obtain. A satisfactory system has not yet been proposed.

SUMMARY OF THE INVENTION

The present invention has been made in consideration of the above situation, and has as its object to provide a magneto-optical recording method capable of achieving a practical optical power modulation overwrite operation and a magneto-optical recording medium used in this method.

There is provided a first magneto-optical recording method for radiating light beam having at least recording and erasure power levels onto a magneto-optical recording medium having a recording layer for magneto-optically recording data and a bias layer magnetostatically coupled to the recording layer, and for recording and erasing information, satisfying conditions for:

(a) causing a beam irradiated portion of the recording layer to reach a magnetization reversal temperature of the recording layer upon radiation of a light beam having a recording power level, and causing a direction of magnetization of the beam irradiated portion of the recording layer to be aligned with a direction of a leakage field generated by a special distribution of magnetization formed upon heating of the bias layer;

(b) causing the beam irradiated portion of the recording layer to reach the magnetization reversal temperature of the recording layer upon radiation of a light beam having an erasure power level, and directing the direction of magnetization of the recording layer to a direction opposite to that of the leakage field obtained upon radiation of the light beam having the recording power level since a magnitude of the leakage field generated by a special distribution of magnetization formed by heating of the bias layer is different from that generated upon radiation of the light beam having the recording power level; and (c) causing directions of magnetization of the bias layer to be the same before and after the radiation of the light beam having the recording power level and before and after the radiation of the light beam having the erasure power level.

There is also provided a second magneto-optical recording method for radiating light beams having at least recording and erasure power levels onto a magneto-optical recording medium having a recording layer for magneto-optically recording data and a bias layer magnetostatically coupled to the recording layer, and for recording and erasing information, satisfying conditions for:

(a) causing a beam irradiated portion of the recording layer to reach a magnetization reversal temperature of the recording layer upon radiation of a light beam having an erasure power level, and causing a direction of magnetization of the beam irradiated portion of the recording layer to be aligned with a direction of a leakage field generated by a special distribution of magnetization formed upon heating of the bias layer;

(b) causing the beam irradiated portion of the recording layer to reach the magnetization reversal temperature of the recording layer upon radiation of a light beam having a recording power level, and directing the direction of magnetization of the recording layer to a direction opposite to that of the leakage field obtained upon radiation of the light beam having the erasure power level since a magnitude of the leakage field generated by a special distribution of magnetization formed by heating of the bias layer is different from that generated upon radiation of the light beam having the erasure power level; and (c) causing directions of magnetization of the bias layer to be the same before and after the radiation of the light beam having the recording power level and before and after the radiation of the light beam having the erasure power level.

There is provided a first magneto-optical recording medium, having a recording layer for magneto-optically recording data and a bias layer magnetostatically coupled to the recording layer, for recording and erasing information upon radiation of light beams having at least recording and erasure power levels, satisfying conditions for:

(a) causing a beam irradiated portion of the recording layer to reach a magnetization reversal temperature of the recording layer upon radiation of a light beam having a recording power level, and causing a direction of magnetization of the beam irradiated portion of the recording layer to be aligned with a direction of a leakage field generated by a special distribution of magnetization formed upon heating of the bias layer;

(b) causing the beam irradiated portion of the recording layer to reach the magnetization reversal temperature of the recording layer upon radiation of a light beam having an erasure power level, and directing the direction of magnetization of the recording layer to a direction opposite to that of the leakage field obtained upon radiation of the light beam having the recording power level since a magnitude of the leakage field generated by a special distribution of magnetization formed by heating of the bias layer is different from that generated upon radiation of the light beam having the recording power level; and (c) causing directions of magnetization of the bias layer to be the same before and after the radiation of the light beam having the recording power level and before and after the radiation of the light beam having the erasure power level.

There is also provided a second magneto-optical recording medium, having a recording layer for magneto-optically recording data and a bias layer magnetostatically coupled to the recording layer, for recording and erasing information upon radiation of light beams having at least two different power levels, i.e., recording and erasure power levels, satisfying conditions for:

(a) causing a beam irradiated portion of the recording layer to reach a magnetization reversal temperature of the recording layer upon radiation of a light beam having an erasure power level, and causing a direction of magnetization of the beam irradiated portion of the recording layer to be aligned with a direction of a leakage field generated by a special distribution of magnetization formed upon heating of the bias layer;

(b) causing the beam irradiated portion of the recording layer to reach the magnetization reversal temperature of the recording layer upon radiation of a light beam having a recording power level, and directing the direction of magnetization of the recording layer to a direction opposite to that of the leakage field obtained upon radiation of the light beam having the erasure power level since a magnitude of the leakage field generated by a special distribution of magnetization formed by heating of the bias layer is different from that generated upon radiation of the light beam having the erasure power level; and (c) causing directions of magnetization of the bias layer to be the same before and after the radiation of the light beam having the recording power level and before and after the radiation of the light beam having the erasure power level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view showing a main part of a magneto-optical recording medium according to an embodiment of the present invention;

FIG. 2 is a view showing power levels of light beam for performing an overwrite operation for the medium shown in FIG. 1;

FIG. 4 is a sectional view showing the main part of a magneto-optical recording medium obtained by further forming a reversal preventive layer on the medium shown in FIG. 1 according to another embodiment of the present invention;

FIG. 5 is a graph showing changes in recording layer temperature ($T_S$) and bias layer temperature ($T_B$) as a function of time when a light beam is radiated on the medium shown in FIG. 4 from the recording layer side;

FIGS. 14A and 14B are views showing another state of a beam irradiated portion in the recording mode according to the present invention;

FIGS. 15A and 15B are views showing another state of a beam irradiated portion in the erasure mode according to the present invention;

FIG. 16 is a sectional view showing an magneto-optical recording medium according to still another embodiment of the present invention;

FIG. 17 is a graph showing $M_{SB}(T)$ CharaCteristiCs of a bias layer of an example of the medium shown in FIG. 16, and a relationship between temperature T and a leakage field $H_l$ at the heating center when a full-width at half maximums of the bias layer has a Gaussian heat distribution of 0.8 μm;

FIG. 18 is a graph showing a relationship between temperature T at the heating center which is obtained on the basis of $M_{SI}(T)$ characteristics of the inversion preventive layer of the example of the medium shown in FIG. 16 and a Gaussian heat distribution having a full-width at half maximum of 0.8 μm, and a leakage field $H_l$;

DETAILED DESCRIPTION OF THE PREFERRED EMBODIMENTS

Figure 3A:
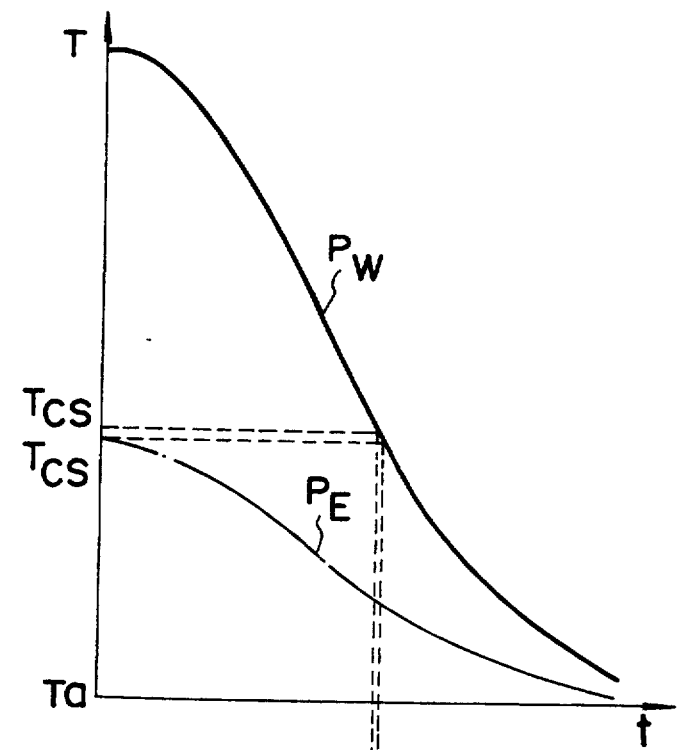
FIGS. 3A to 3C are graphs for explaining the principle of the overwrite operation for the medium shown in FIG. 1.

In order to clarify differences between the prior arts and the present invention, an effective magnetic field ($H_{eff}$) applied to the recording layer will be briefly described below. The effective magnetic field $H_{eff}$ in the presence of only a recording layer as a magnetic layer is defined as follows:

$$H_{eff} = H_W + H_d + H_{ex} \quad (1)$$

(where $H_W$ is the magnetic field caused by magnetic domain wall energy, $H_d$ is the self-leakage field, and $H_{ex}$ is the external magnetic field). The magnetic field $H_W$ in equations (1) need not be taken into consideration at a position where magnetic domain walls are not present. A condition for causing magnetization reversal is to set the effective field $H_{eff}$ to be higher than a coercive force (a nucleus generation field of a reversal of a magnetic domain or a magnetic domain wall frictional force) of the recording layer. This condition can be given as:

$$H_{eff} > H_c \quad (2)$$

where $H_C$ is the coercive force of the recording layer. When condition (2) is satisfied, the direction of magnetization of the recording layer is aligned with that of the effective field $H_{eff}$ or the magnetic walls are regarded to be moved at a speed $V_W$ { $= \mu W \times (|H_{eff}| - H_C)$; $\mu W$ magnetic domain wall mobility}. This is the meaning of the effective field $H_{eff}$. That is, the overwrite operation can be performed by radiating a light beam to satisfy condition (2) and modulating the effective field $H_{eff}$ in the upward and downward directions at high speed (without waiting for rotation).

An overwrite operation for a disk having a single recording layer as a magnetic layer can be achieved by modulating at least one of $H_W$, $H_d$, and $H_{ex}$ of equation (1) in two directions at high speed.

The external field $H_{ex}$ is positively modulated to achieve the magnetic modulation described above.

To the contrary, the external field $H_{ex}$ is kept constant in the recording and erasure modes to achieve the light power modulation. In the light power modulation, at least two power levels which satisfy condition (2) are selected. A light beam having one power level (recording level) is radiated on the recording layer to direct the effective field $H_{eff}$ in the recording direction, and the light beam having the other power level (erasure level) is radiated on the recording layer to modulate the direction of the effective field $H_{eff}$ in the erasure direction.

As is apparent from equation (1), in order to modulate the effective field $H_{eff}$ under the constant $H_{ex}$, the field $H_W$ or the field $H_d$ must be power-modulated when a single recording layer is used. A proposal for modulating the field $H_W$ is disclosed in, e.g., Appl. Phys. Lett., Vol. 52, No. 18, PP. 1,537–1,539, 1988. A proposal for modulating the field $H_d$ is disclosed in, e.g., Appl. Phys. Lett. Vol. 56, No. 26, PP. 2,690–2,692, 1990.

In order to power-modulate the field $H_W$ or $H_d$, the internal magnetic fields ($H_W$ and $H_d$) of the recording layer in which a reversed magnetic domain is to be formed must be modulated. It is therefore difficult to obtain a larger degree of modulation and to control thermo-magnetic characteristics of the recording layer.

According to another proposal for a light power modulation overwritable magneto-optical medium, an internal field except for $H_W$ and $H_d$ is applied and optically modulated to increase the degree of modulation of the internal magnetic field. When an auxiliary magnetic layer is stacked on the recording layer, an effective magnetic field $H_{eff}$ can be represented as follows:

$$H_{eff} = H_W + H_d + H_{ex} + H_{exg} + H_l \quad (3)$$

where $H_{exg}$ is the magnetic field based on magnetic wall energy of an interface between the recording layer and the auxiliary magnetic layer, and $H_l$ is the leakage field of the auxiliary magnetic layer.

As can be apparent from equation (3), the fields $H_{exg}$ and $H_l$ are added as internal fields subjected to optical modulation.

Of these internal fields, a method of modulating the field $H_{exg}$ is disclosed in, e.g., Published Japanese Unexamined Patent Application No. 62-175949. This method, however, poses the following problems. The magnetic wall energy at the interface between the recording magnetic layer and the auxiliary magnetic layer and the magnetic properties of the respective layers must be controlled as a function of temperature. A reversed magnetic domain must be formed in the auxiliary recording layer during recording, and it is difficult to achieve both a high recording sensitivity and a large erasure power margin to transfer the reversed magnetic domain to the recording layer during cooling by using the field $H_{exg}$. An initial magnetic field ($H_{ini}$) for initializing the auxiliary layer is required. In this case, the field $H_{ini}$ is a new parameter which is not present in equation (3). It is not easy to set conditions including this new parameter. If an external magnetic field is used as a source for $H_{ini}$, this leads to a disadvantage in compactness of a drive. When a switching layer initializing layer is formed in addition to the recording layer and the auxiliary magnetic layer in the medium and an $H_{ini}$ source is formed inside the medium (e.g., J. Appl. Phys. Vol. 67, No. 9, PP. 4,415–4,416, 1990), a further parameter for controlling a thermal factor must be used to more complicate control.

A structure for binary-modulating the field $H_l$, is constituted by a magnet layer and a longitudinal magnetic layer as auxiliary magnetic layers, as disclosed in, e.g., IEEE Trans. Magn. Vol. 25, No. 5, PP. 4,036–4,038, 1989. In this method, no field $H_{exg}$ acts between the recording layer and the auxiliary magnetic layer (coupling in which the field $H_{exg}$ does not almost act is called as magnetostatic coupling in the present invention). The conventional method of binary-modulating the field $H_l$ has the following drawbacks. A sufficient $H_l$ cannot be obtained from the magnet layer unless a step such as a groove is utilized. If no groove is provided, two external fields $H_{ex}$ are required, and a material for the longitudinal magnetic layer cannot be easily selected.

According to the present invention, there is provided a magneto-optical recording method using the binary modulation of the field $H_l$ as its principle and overcoming the conventional drawbacks described above, and a magneto-optical recording medium using this method.

More specifically, according to the magneto-optical recording method of the present invention, as compared with an external field modulation method, a two-sided disk can be easily used, a high transfer rate can be obtained, and at the same time low power consumption can be achieved. The magneto-optical recording medium according to the present invention is compatible with commercially available magneto-optical disks.

The present invention is superior to the conventional light power modulation method in the following respects. A degree of modulation of the internal magnetic field can be larger than that of a disk using a single recording layer. Control of magneto-thermal characteristics can be facilitated as compared with a disk using an exchange coupling multilayered medium (i.e., a disk using the $H_{exg}$). Both high sensitivity and a large erasure power margin can be achieved, and no $H_{ini}$ is required. No step is required as compared with the conventional medium utilizing the field $H_l$, and a wider selection of materials and compositions of the respective layers is allowed.

The present invention will be described in detail below.

Prior to a detailed description, abbreviations and symbols used in the present invention will be summarized below.

$P_W$: recording power level; $P_E$: erasure power level; $P_R$: reproduction power level; $H_{ex}$: external magnetic field; $H_W$: magnetic field caused by magnetic domain wall energy; $H_d$: self-leakage field of recording layer; $H_{exg}$: magnetic field based on magnetic wall energy at interface between magnetic layers (the field $H_{exg}$ described above is its general form, i.e., the above-mentioned field $H_{exg}$ can be represented as an $H_{exg}$ between the recording layer and the auxiliary magnetic layer); $H_l$: leakage field applied from auxiliary magnetic layer to recording layer (if the auxiliary magnetic layer consists of a plurality of layers, $H_l$, represents a leakage field from the i layer); $H_{eff}$: effective field applied to recording layer; $H_C$: coercive force {$H_{CS}$: recording layer, $H_{CB}$: bias layer, $H_{CI}$: reversal preventive layer}; $M_S$: magnetization {$M_{SS}$: recording layer, $M_{SB}$: bias layer, $M_{SI}$: reversal preventive layer}; T: temperature of each layer {$T_S$: recording layer, $T_B$: bias layer, $T_I$: reversal preventive layer}; $T_C$: Curie point {$T_{CS}$: recording layer, $T_{CB}$: bias layer, $T_{CI}$: reversal preventive layer}; $T_R$: magnetization reversal temperature of recording layer; $T_a$: memory retention temperature; $P_{th}$: recording power threshold value; and t: time.

FIG. 1 is a sectional view showing the main part of a magneto-optical medium used in the present invention. Reference numeral 1 denotes a recording layer; 3, a nonmagnetic intermediate layer; and 2, a bias layer. The nonmagnetic intermediate layer 3 is formed to eliminate the field $H_{exg}$ acting between the recording layer 1 and the bias layer 2. If the field $H_{exg}$ is sufficiently small even if the intermediate layer 3 is not present, the intermediate layer 3 can be omitted. That is, according to the present invention, the recording layer 1 and the bias layer 2 are magnetostatically coupled, and the field $H_{exg}$ need not be practically taken into consideration.

A light beam is preferably radiated on the magneto-optical recording medium from the above, i.e., from the recording layer. Arrows in the recording and bias layers 1 and 2 in FIG. 1 represent a direction of initial magnetization of each layer. This direction is downward. FIG. 2 is a view showing power levels of light beam used to overwrite the medium shown in FIG. 1.

The principle of the present invention will be described with reference to FIGS. 3A to 3C.

Changes in temperatures of the recording and bias layers upon radiation of the light beam modulated as shown in FIG. 2 on the medium shown in FIG. 1 are shown in FIG. 3A. Referring to FIG. 3A, a curve represented by $P_W$ indicates changes in temperatures of the recording layer 1 and the bias layer 2 as a function of time upon $P_W$ radiation. A curve represented by $P_E$ indicates changes in temperatures of the recording and bias layers as a function of time upon $P_E$ radiation. The temperature $T_S$ may be different from or equal to the temperature $T_B$. It is easy to overwrite information in the medium when $T_S$ is different from $T_B$. However, FIGS. 3A to 3C show a case of $T_S=T_B$. Even if $T_S$ is different from $T_B$, the overwrite operation can be performed in accordance with the same principle as described above.

The temperature $T_{CS}$ and the power level $P_E$ are so set that $T_S$ reaches $T_{CS}$ or at least $T_R$ upon radiation of an erasure light beam. Since the temperature $T_R$ satisfies condition $|H_{eff}| = H_{CS}$, the temperature $T_R$ depends on $H_W$, $H_d$, and $H_{ex}$. That is, the temperature $T_R$ is determined by a disk linear velocity, a radiation pulse time of the light beam, heat response characteristics of the medium, thermomagnetic characteristics of the respective layers, and the like. For example, the temperature $T_{CB}$ is set to be slightly higher than the temperature $T_S$ during radiation. FIG. 3B represents preferable $M_{SB}(T)$ characteristics. That is, the magnetization $M_{SB}(T)$ preferably has characteristics which do not change in the range of $T_a$ to $T_{CB}$ but are abruptly attenuated near $T_{CB}$.

Figure 3B:
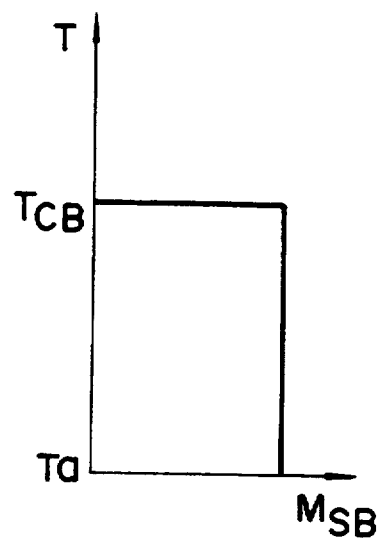
Figure 3C:
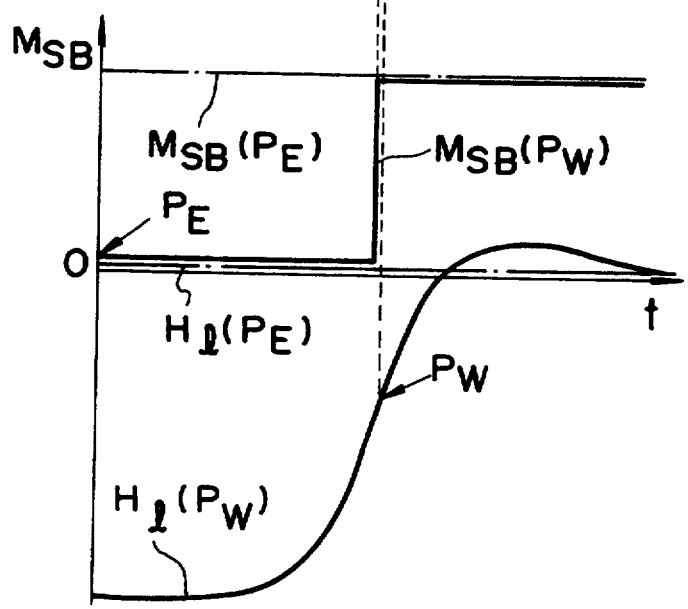

$M_{SB}$ during $P_W$ and $P_E$ radiation and $H_l$ generated by the $M_{SB}$ as a combination of FIGS. 3A and 3B are shown in FIG. 3C. The time t is plotted along the abscissa of each of FIGS. 3A and 3C. However, a spatial distribution of T, $M_{SB}$, and $H_I$ may be plotted in FIGS. 3A and 3C because an arbitrary position x in a moving direction is given as $x = V_e \times t$ where $V_I$ is the linear velocity of the medium while a light beam is moved relative to the medium. More specifically, an $M_{SB}$ spatial distribution upon $P_W$ radiation is of a well type, as indicated by $M_{SB}(P_W)$ in FIG. 3C. The $M_{SB}$ spatial distribution during $P_E$ radiation is uniform, as indicated by $M_{SB}(P_W)$ in FIG. 3C.

$H_I(P_W)$ generated from the bias layer to the recording layer, which is caused by a well type magnetic distribution indicated by $M_{SB}(P_W)$ is shown in FIG. 3C. At a position or time obtained when the temperature of the recording layer reaches the magnetization reversal temperature, the recording layer receives the field $H_I$ having an intensity represented by an arrow $(P_W)$ on $H_I(P_W)$ in FIG. 3C.

On the other hand, since no magnetic field is generated outside a uniformly magnetized magnetic thin film (approximate to an infinite flat plate), $H_I(P_W)$ caused by $M_{SB}(P_E)$ receives $H_I$ $(=0)$ having an intensity represented by an arrow $(P_E)$ on $H_I(P_E)$ in FIG. 3C at a position or time obtained when the recording layer reaches the magnetization reversal temperature, as shown in FIG. 3C.

In this case, the field $H_I$ in equation (3) is modulated by way of light power. That is, when the terms except for the $H_I$ term in equation (3) are appropriately selected, the magnetization of the recording layer during $P_W$ radiation is inverted in accordance with the direction of $H_I(P_W)$ while condition $|H_{eff}| > H_{CS}$ is satisfied. Therefore, the direction of magnetization of the recording layer 1 can be opposite to that of $H_I(P_W)$ during $P_E$ radiation, and a light power modulation overwrite operation can be performed.

As described above, even if condition $T_S = T_B$ is established upon radiation of a light beam, i.e., even if the temperature of the recording layer is equal to that of the bias layer, the field $H_I$ can take a binary value depending on a light power. However, when $T_S$ is different from $T_B$, i.e., when the temperature of the recording layer is different from that of the bias layer, the degree of modulation of $H_I$ is increased.

When the bias layer 2 exceeds $T_{CB}$ during $P_W$ radiation, it is necessary not to invert the magnetization of the bias layer 2 so as to repeat the overwrite operations during cooling. This can be prevented by applying, e.g., a downward external field $H_{ex}$ to the medium when the recording direction is upward, i.e., the $H_I(P_W)$ generation direction in FIG. 1 is given. More specifically, since the direction of the field $H_{ex}$ is a direction for accelerating initialization of the bias layer, inversion of the bias layer can be prevented by this external field $H_{ex}$. An initializing magnet may be arranged at a position except for the laser beam radiation position, as needed. In order to eliminate the initializing magnet and properly prevent inversion of the bias layer, a reversal preventive layer is preferably stacked on the bias layer. Although the reversal preventive layer is not indispensable, it is preferably formed to more practically perform an overwrite operation.

A structure including a reversal preventive layer on a bias layer to prevent magnetization reversal of the bias layer and having a thermal response difference between a recording layer and the bias layer will be described below.

FIG. 4 is a sectional view showing the main part of a magneto-optical medium obtained by further forming a reversal preventive layer in the medium shown in FIG. 1. Referring to FIG. 4, reference numerals 1 to denote the identical parts to those in FIG. 1. A reversal preventive layer 4 is formed on the bias layer 2. In this case, the nonmagnetic intermediate layer 3 has a function of differentiating thermal response characteristics of the recording layer 1 from those of the bias layer 2 in addition to a function of not applying the field $H_{exg}$ between the recording layer and the bias layer. The bias layer 2 is preferably exchange-coupled to the reversal preventive layer 4, and the field $H_{exg}$ which overcomes $H_{CB}$ (coercive force of the bias layer) is preferably applied between the bias layer 2 and the reversal preventive layer 4.

Time changes (equivalent to a spatial distribution) in recording layer temperatures ($T_S$) and bias layer temperatures ($T_B$), which are obtained upon radiation of a light beam on the medium of FIG. 4 from the recording layer 1 side are shown in FIG. 5. The temperature rise of each layer per unit power (1 mW) is plotted along the ordinate in FIG. 5, and time or position in a track direction is plotted along the abscissa. As is apparent from FIG. 5, by appropriately selecting a layer structure of the medium, condition $T_S > T_B$ can be obtained during the temperature rise upon light beam radiation or at an edge portion corresponding a direction toward which a light beam is moved of the beam irradiated portion, or condition $T_S = T_B$ can be obtained during cooling or at an edge portion corresponding a direction opposite to the direction toward which a light beam is moved. Since the bias layer and the reversal preventing layer are directly in contact with each other, a temperature difference therebetween is small. By utilizing the response characteristics of $T_S$ and $T_B$ and a difference in spatial distribution, the field $H_I$ can be largely modulated by the light power.

Figure 6A:
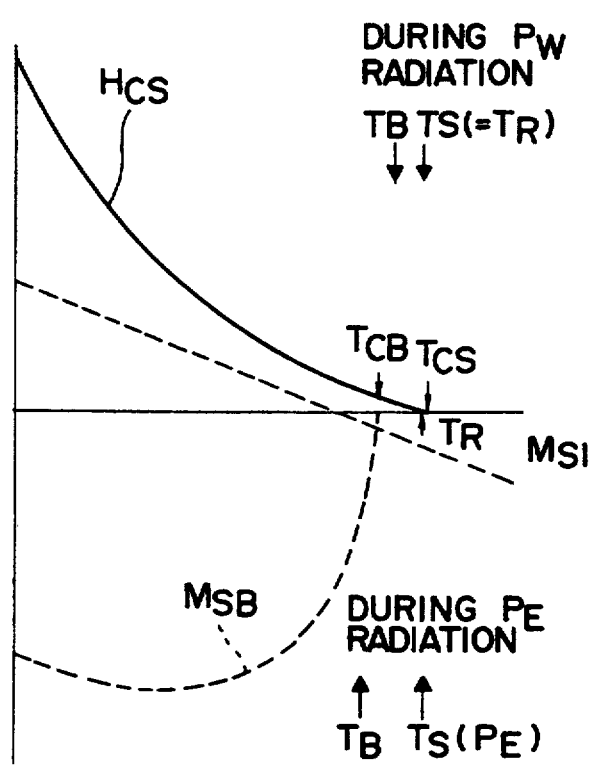
FIGS. 6A to 6C are views for explaining the principle of the overwrite operation for the medium shown in FIG. 4.
Figure 6B:
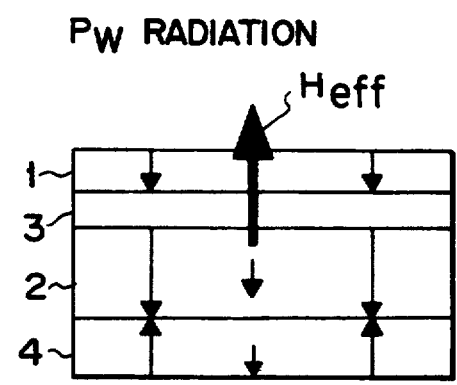
Figure 6C:
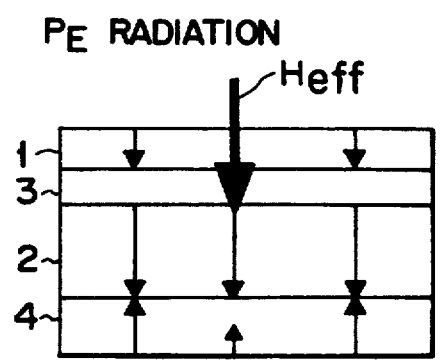

FIGS. 6A to 6C are views showing the above principle of the overwrite operation. FIG. 6A shows temperature dependency of the magnetic characteristics of each layer and the positions of $T_S$ and $T_B$ during $P_W$ radiation and $P_E$ radiation. FIG. 6B shows magnetization distributions and fields $H_{eff}$ of the respective layers during $P_W$ radiation. FIG. 6C is a view showing magnetization distributions and fields $H_{eff}$ of the respective layers during $P_E$ radiation.

Referring to FIG. 6A, $T_S$ and $T_B$ are increased to maximum temperatures higher than the Curie points $T_{CS}$ and $T_{CB}$ during $P_W$ radiation. Condition $T_S > T_B$ is established during heating. However, during cooling, condition substantially $T_S = T_B$ is established by thermal diffusion between the recording and bias layers in the direction of film thickness. More specifically, as shown in FIG. 6A, during cooling upon $P_W$ radiation, $T_S$ is decreased to be lower than $T_{CS}$ and reaches $T_R$ (i.e., position of the arrow represented by $T_S$). In this state, $T_B$ is close to $T_S$. If $T_{CB}$ is so set that $T_B$ is higher than $T_{CB}$ and close to $T_{CB}$, $M_{SB}$ is largely changed in the range of $T_a$ to $T_B$. That is, $M_{SB}$ is spatially changed by a large magnitude.

During $P_E$ radiation, $P_E$ is selected to sufficiently differentiate $T_S$ from $T_B$ for substantially $T_S = T_R$. When substantially $T_S = T_R$, $T_B$ is lower than $T_{CB}$ and $M_{SB}$ is only slightly changed in the range of $T_a$ to $T_B$. That is, an almost uniform spatial distribution is obtained.

When condition substantially $T_S = T_R$ upon $P_W$ radiation is established, the magnetization of each layer is indicated by thin arrows in FIG. 6B. The central one of the three arrows corresponds to the beam irradiated portion. As previously described, if $T_S = T_R$ is substantially satisfied upon $P_W$ radiation, since $T_B$ is close to $T_{CB}$, magnetization of the beam irradiated portion of the bias layer 2 almost disappears (indicated by a short arrow). A large upward H, is generated, as shown in FIG. 6B. By selecting the terms (provided that the field $H_{exg}$ need not be taken into consideration in the present invention, as previously described) except for $H_I$ in equation (3), an upward effective field $H_{eff}$, as indicated by a thick arrow in FIG. 6B, can be generated. For example, if material of the recording layer is selected and conditions of $H_{ex}$ are set so as to obtain the characteristics shown in FIG. 6A, the direction of $H_{eff}$ is the recording direction. Since condition $|H_{eff}| > H_{CS}$ is already satisfied, the direction of magnetization of the recording layer 1 is reversed, so that a recording magnetic domain is formed.

On the other hand, the magnetization of the bias layer 2 is almost spatially uniform upon $P_E$ radiation and almost no field $H_I$ is generated, as shown in FIG. 6C. Therefore, the direction of magnetization of the magnetic field $H_{eff}$ can be directed downward in the presence of the same $H_{ex}$ set to direct the $H_{eff}$ upward upon $P_W$ radiation. In this case, since $|H_{eff}| > H_{CS}$, the magnetization of the $P_E$ irradiated portion of the recording layer 1 can be reversed from that upon $P_W$ radiation, thereby aligning the directions downward (FIG. 6C) and hence performing erasure.

The principle of FIGS. 6A to 6C is different from that of FIGS. 3A to 3C in that a large degree of modulation for $H_I$ can be obtained by even using practically obtained $M_{SB}(T)$ characteristics, and that the field $H_I$ can be modulated in a wide area of the laser irradiated portion. By using the method shown in FIGS. 6A to 6C, selection of a medium film material can be facilitated, and recording/erasure of information corresponding to a large inversion magnetic domain can be performed.

An effect of the reversal preventive layer 4 for preventing reversal of the bias layer and an influence of a leakage field caused by a magnetization distribution formed in the reversal preventive layer 4 will be described below. A material for the reversal preventive layer 4 is preferably a material having a high magnetization reversal temperature enough to prevent reversal upon $P_W$ and $P_E$ radiation. Reversal of the bias layer 2 is prevented by an exchange force and leakage field from the reversal preventive layer 4. In general, in order to prevent reversal of the bias layer, an effective magnetic field $H_{effB}$ applied to the bias layer is given as follows:

$$H_{effB} = H_{WB} + H_{dB} + H_{ex} + H_{exgI} + H_{II} \quad (4)$$

(where $H_{WB}$ is the magnetic field caused by magnetic domain wall energy in the bias layer, $H_{dB}$ is the leakage field from the bias layer itself or the demagnetizing field in the bias layer, $H_{exgI}$ is the magnetic field applied from the reversal preventive layer to the bias layer by means of an exchange force, and $H_{II}$ is the magnetic field applied to the bias layer by the leakage field from the reversal preventive layer). In this case, a magnetic field leaking from the recording layer 1 to the bias layer 2 is taken into consideration when the thickness of the recording layer 1 is large. The field $H_{WB}$ is taken into consideration because an overwrite operation can be performed even if the bias layer 2 is instantaneously inverted during heating or cooling. Basically, it is essential to restore the direction of magnetization of the bias layer 2 to the initial magnetization direction before the next overwrite beam radiation.

The reversal preventive effect of the reversal preventive layer 4 can be obtained by $H_{exgI}$ and $H_{II}$ in equation (4). By this effect, condition $|H_{effB}| > H_{CB}$ can be satisfied, and at the same time the direction of the effective field $H_{effB}$ prevents reversal of the bias layer 2. Note that the reversal preventive layer 4 need not be exchange-coupled to the bias layer 2. In order to enhance the reversal preventive effect, the field $H_{exgI}$ between the bias layer and the reversal preventive layer is preferably higher than the coercive force $H_{CB}$ of the bias layer 2 in all temperature ranges obtained upon $P_W$ and $P_E$ radiation.

The initial directions of the bias layer 2 and the reversal preventive layer 4 are so set that interface magnetic domain wall are not formed between the adjacent layers. For example, when the bias layer 2 and the reversal preventive layer 4 are made of a material of a heavy rare earth metal-transition metal ferri-magnetic alloy (RE-TM), the directions of sublattice magnetization of the respective layers are aligned with each other. In addition, when RE-TM films constituting the bias layer 2 and the reversal preventive layer 4 are formed in a anti-parallel state, the directions of initial magnetization of the bias layer 2 and the reversal preventive layer 4 are opposite to each other, as shown in FIG. 4 and FIGS. 6A to 6C.

In this case, the field $H_{II}$ also serves to prevent reversal of the bias layer in addition to the field $H_{exgI}$ in equation (4).

The influence of the magnetic field leaking from the reversal preventive layer 4 to the recording layer 1 will be described below. When the reversal preventive layer 4 having the $M_{SI}(T)$ characteristics shown in FIG. 6A is selected, the temperature $T_I$ of the reversal preventive layer comes close to $T_B(P_W)$ during cooling upon $P_W$ radiation for substantially $T_S = T_R$, and comes close to $T_B(P_E)$ upon $P_E$ radiation. The spatial distribution of $M_{SI}$ obtained upon $P_W$ radiation is different from that obtained upon $P_E$ radiation as in the case of the bias layer 2. In addition, as for the initial magnetization directions shown in FIG. 4, the leakage field applied from the reversal preventive layer 4 to the recording layer has a direction opposite to that of the leakage field applied from the bias layer 2 to the recording layer 1. At the same time, as shown in FIG. 6A, the leakage field applied from the reversal preventive layer 4 to the recording layer 1 upon $P_W$ radiation is higher than that upon $P_E$ radiation and attenuates the degree of modulation of the power of the leakage field $H_I$ from the bias layer 2.

However, when a reversal preventive layer having the $M_{SI}(T)$ characteristics which are gradually changed as a function of T shown in FIG. 6A, the leakage filed from the reversal preventive layer is not cancelled with the $H_I$ and the degree of modulation of the power of the field $H_I$ is not disappeared because the degree of modulation of the power of the leakage field from the reversal preventive layer 4 to the recording layer 1 is smaller than that of $H_I$. Since a distance between the reversal preventive layer 4 and the recording layer 1 is larger than that between the bias layer 2 and the recording layer 1, the leakage field from the reversal preventive layer 4 to the recording layer 1 is smaller than the $H_I$, and the influence of the $H_I$ on the degree of modulation is further reduced.

Although incidence of a recording/erasure beam from the side of the bias layer 2 or the reversal preventive layer 4 is not necessarily preferable, if this operation is to be forcibly performed, a temperature difference satisfying condition $T_B > T_S$ can be obtained. In this case, the temperature $T_S$ obtained upon $P_W$ radiation may be set to be lower than the temperature $T_B$ upon $P_E$ radiation for substantially $T_S = T_R$. In the same manner as previously described, the field $H_I$ may be modulated to perform an overwrite operation. In this case, however, when a material such as RE-TM films having a large light absorbance is used to form the bias layer 2 or the reversal preventive layer 4, the reproduction beam must be radiated from the recording layer side. Therefore, beams must be incident on the medium from the upper and lower directions, or the recording/erasure operation must be performed independently of the reproduction operation.

Figure 7:
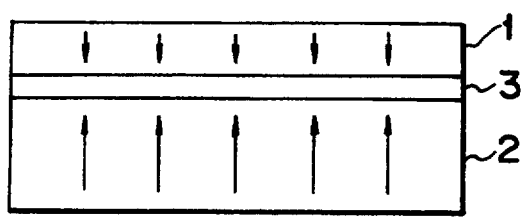
FIG. 7 is a sectional view showing the main part of a magneto-optical recording medium according to still another embodiment of the present invention.
Figure 8:
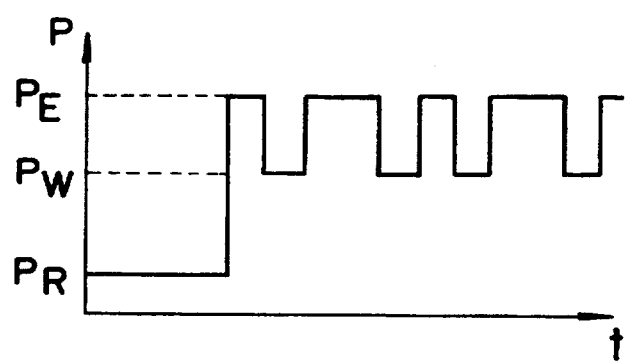
FIG. 8 is a view showing power levels of light beams for performing the overwrite operation for the medium shown in FIG. 7.

A "recording assistance" for causing magnetic reversal by utilizing a leakage field from the bias layer in the recording mode has been described above. The present invention can be equally applied to an "erasure assistance" for causing magnetization reversal by utilizing a leakage field from the bias layer in the erasure mode. In this case, as shown in FIG. 7, the direction of initial magnetization of the bias layer 2 is upward, as opposed to the case of FIG. 1 and is set to be opposite to that of initial magnetization of the recording layer 1. As shown in FIG. 8, the power level of the light beam is set to be opposite to that shown in FIG. 2. That is, the erasure power level $P_E$ is set to be higher than the recording power level $P_W$.

Figure 9A:
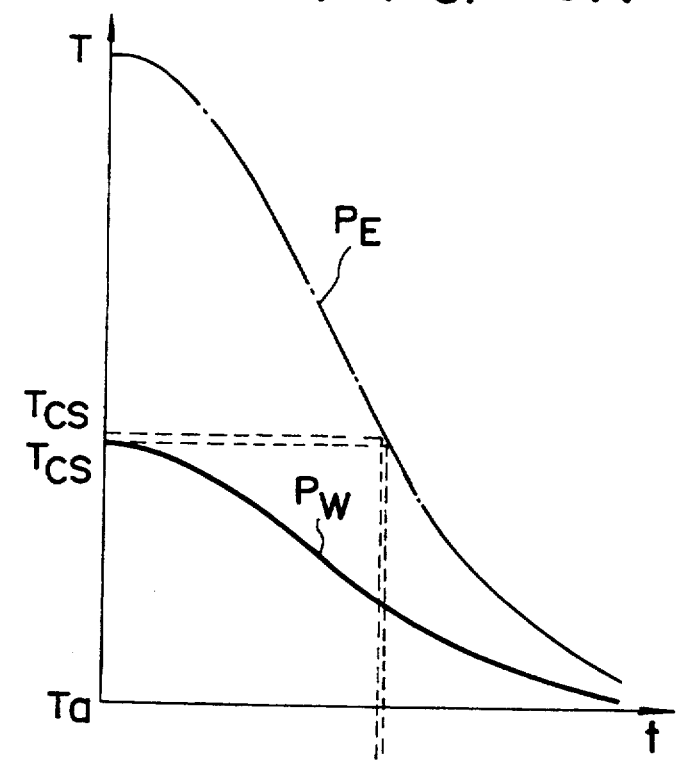
FIGS. 9A to 9C are views for explaining the principle of the overwrite operation for the medium shown in FIG. 7.
Figure 9B:
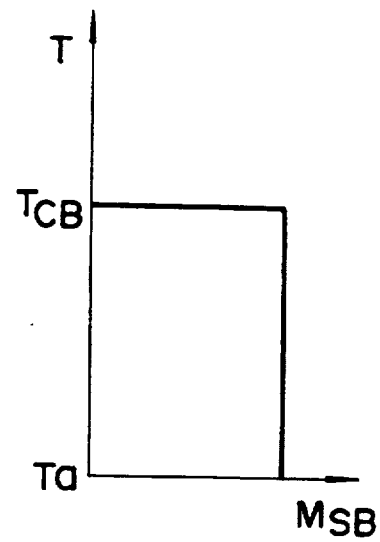
Figure 9C:
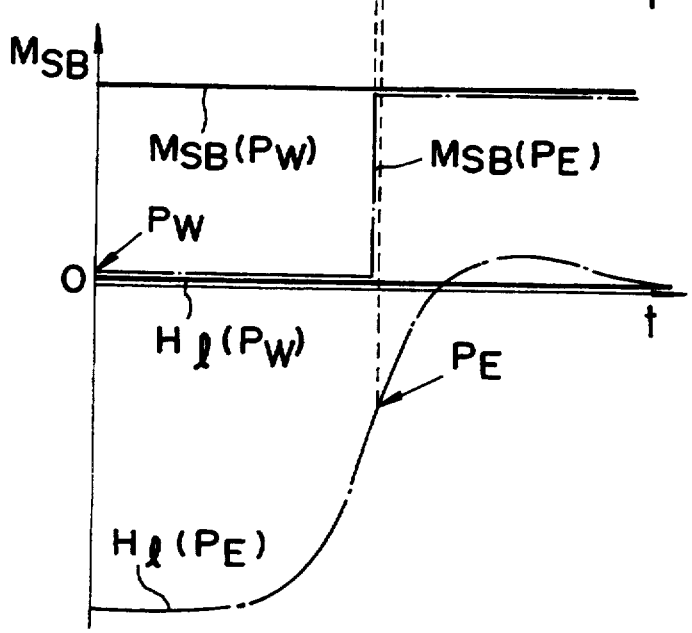
Figure 10:
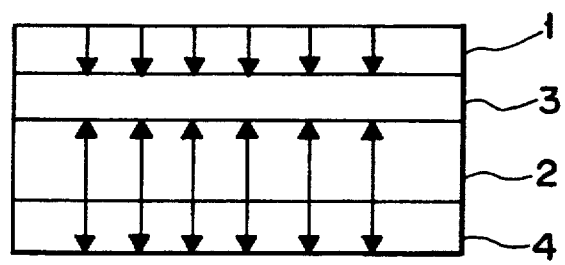
FIG. 10 is a sectional view showing the main part of a magneto-optical recording medium obtained by further forming a reversal preventive layer on the medium shown in FIG. 7 according to still another embodiment of the present invention.

A power-modulated light beam is radiated on the medium shown in FIG. 7 to perform an overwrite operation, and its principle is the same as that described with reference to FIGS. 3A to 3C. As shown in FIG. 9A to 9C, a curve corresponding to $P_W$ is replaced with a curve corresponding to $P_E$. In this mode of operation, in the same manner as in the "recording assistance", the field $H_I$ in equation (3) is modulated with a light power. More specifically, when the terms except for $H_I$ in equation (3) are properly selected, an optical modulation overwrite operation can be performed wherein condition $|H_{eff}| > H_{CS}$ is satisfied, the direction of magnetization of the recording layer is reversed in accordance with the direction of the field $H_I(P_E)$ upon $P_E$ radiation, and the direction of the recording layer 1 can be set to be opposite to that of $H_I(P_E)$ upon $P_W$ radiation. Note that FIGS. 9A to 9C respectively correspond to FIGS. 3A to 3C.

Figure 11A:
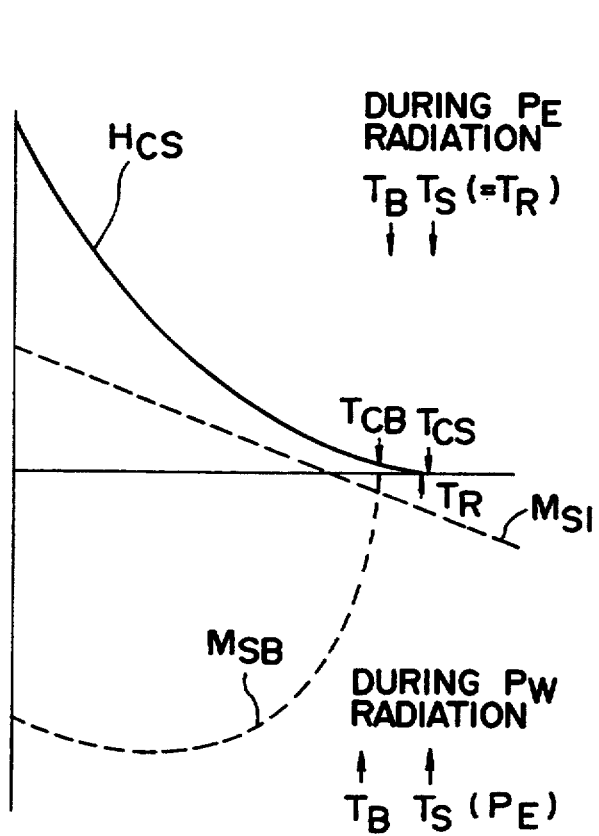
FIGS. 11A to 11C are views for explaining the principle of the overwrite operation for the medium shown in FIG. 10.
Figure 11B:
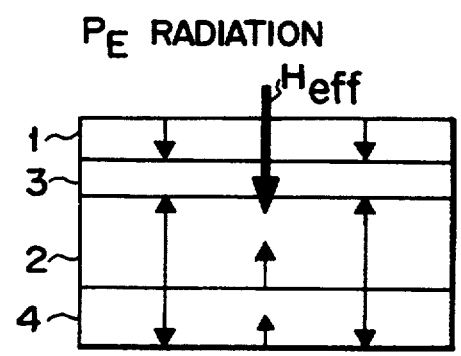
Figure 11C:
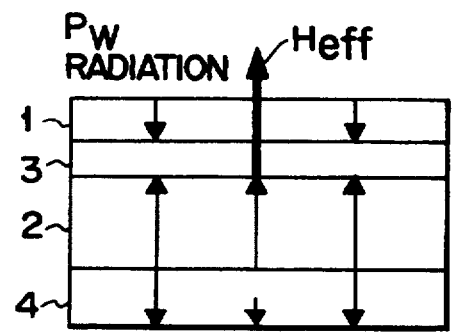

When the reversal preventive layer 4 is formed, the directions of initial magnetization of the bias layer 2 and the reversal preventive layer 4 are opposite to those of FIG. 4, as shown in FIG. 10, and FIGS. 11A to 11C show its overwrite principle. As compared with FIGS. 6A to 6C, the temperatures $T_S$ and $T_B$ upon $P_W$ radiation are replaced with those of $P_E$ radiation. The principle in FIGS. 11A to 11C is substantially the same as that in FIGS. 6A to 6C. More specifically, as shown in FIG. 11A, the temperatures $T_S$ and $T_B$ reach maximum temperatures higher than the Curie points $T_{CS}$ and $T_{CB}$ upon $P_E$ radiation. During heating, condition $T_S > T_B$ is satisfied. However, during cooling, condition $T_S = T_B$ is substantially satisfied by thermal diffusion between the recording and bias layers in the direction of thickness. More specifically, as shown in FIG. 11A, when $T_S$ is decreased to be lower than $T_{CS}$ and reaches $T_R$ (i.e., a position of the arrow indicated by $T_S$) during cooling upon $P_E$ radiation, $T_B$ is almost equal to $T_S$. In this state, $T_B$ is close to $T_S$. If $T_{CB}$ is so set that $T_B$ is higher than $T_{CB}$ and close to $T_{CB}$, $M_{SB}$ is largely changed in the range of $T_a$ to $T_B$. That is, $M_{SB}$ is spatially changed by large magnitude.

During $P_W$ radiation, $P_W$ is selected to largely differentiate $T_S$ from $T_B$ for $T_S = T_R$. When substantially $T_S = T_R$, $T_B$ is lower than $T_{CB}$ and $M_{SB}$ is only slightly changed in the range of $T_a$ to $T_B$. That is, an almost uniform spatial distribution is obtained.

When condition $T_S = T_R$ is established upon $P_E$ radiation, the magnetization of each layer is indicated by thin arrows in FIG. 11B. The central one of the three arrows corresponds to the beam irradiated portion. As previously described, if $T_S = T_R$ is substantially satisfied upon $P_E$ radiation, since $T_B$ is close to $T_{CB}$, magnetization of the beam irradiated portion of the bias layer 2 almost disappears (indicated by a short arrow). A large downward $H_I$, is generated, as shown in FIG. 11B. By selecting the terms (provided that the field $H_{exg}$ need not be taken into consideration in the present invention, as previously described) except for $H_I$ in equation (3), a downward effective field $H_{eff}$, as indicated by a thick arrow in FIG. 11B, can be generated. For example, if material of the recording layer is selected and conditions of $H_{ex}$ are set so as to obtain the characteristics shown in FIG. 11A, the direction of $H_{eff}$ is the erasure direction. Since condition $|H_{eff}| > H_{CS}$ is already satisfied, the direction of magnetization of the recording layer 1 is reversed to that of $|H_{eff}|$, and a recording magnetic domain disappears.

On the other hand, upon $P_W$ radiation, the magnetization of the bias layer 2 is almost spatially uniform and almost no field $H_I$ is generated, as shown in FIG. 11C. Therefore, the direction of magnetization of the magnetic field $H_{eff}$ can be directed downward in the presence of the same $H_{ex}$ set to direct the $H_{eff}$ downward upon $P_E$ radiation. In this case, since $|H_{eff}| > H_{CS}$, the magnetization of the $P_W$ irradiated portion of the recording layer 1 can be reversed from that upon $P_E$ radiation, thereby aligning the directions upward (FIG. 11C) and hence performing recording.

A preferred mode of a magneto-optical recording method according to the present invention will be described below.

In the recording assistance ($P_W > P_E$), it seems that a portion in which its coercive force $H_C$ is sufficiently reduced upon $P_W$ radiation has a larger area than a portion in which $H_C$ is sufficiently decreased upon $P_E$ radiation, and that incomplete erasure of information may occur in this larger area. However, incomplete erasure of information is hardly occur.

An overwrite operation according to the present invention is effective to suppressing occurrence of incomplete erasure, improving an erasure ratio, and reducing crosstalk (i.e., two pieces of information between two adjuscened tracks overlapping at one position). This fact will now be explained.

Figure 12:
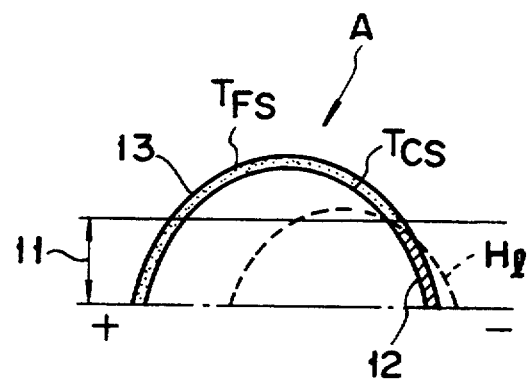
FIG. 12 is a view showing a state of a beam irradiated portion in the recording mode according to the present invention.

FIG. 12 is a view showing a medium portion (FIG. 1) irradiated with the recording light beam $P_W$ when viewed from the beam incident direction. Reference numeral 11 denotes a recording track (the alternate long and short dashed line represents the center line of the track; only an upper portion is illustrated since the entire portion is symmetrical about the alternate long and short dashed line). Reference symbol A denotes a light beam irradiated portion having a predetermined heat distribution. A solid curve represented by $T_{CS}$ represents a Curie temperature curve of the recording layer. A solid curve represented by $T_{FS}$ represents a magnetic domain fixing temperature curve of the recording layer. A dotted curve represented by $H_I$ represents a boundary at which a large leakage field $H_I$ acts on the recording layer on the basis of the magnetization ($M_{SB}$) distribution of the bias layer 2 (the field $H_I$ is applied to a region inside the dotted curve but is not almost applied to a region outside the dotted curve). Referring to FIG. 12, a laser spot is moved from the right to the left. That is, the moving direction is the left direction: a displacement to the left is a positive (+) displacement, while a displacement to the right is a negative (−) displacement. The direction of magnetization of the light beam irradiated portion of the recording layer 1 is determined by regions 12 and 13 surrounded by the $T_{CS}$ and $T_{FS}$ curves in FIG. 12 due to the following reason. In the region inside the $T_{CS}$ curve, the recording layer temperature is higher than $T_{CS}$, the magnetism are lost, and nothing occurs. In the region outside the $T_{FR}$ curve, the coercive force of the recording layer 1 is high enough not to change the direction of magnetization. In the region between the $T_{CS}$ and $T_{FS}$ curves, the coercive force ($H_C$) of the recording layer 1 satisfies condition $H_C < H_{eff}$ where $H_{eff}$ is the effective field applied to the recording layer 1 as described above and can be represented by equation (3) described above.

$$H_{eff} = H_W + H_d + H_{ex} + H_I + H_{exg}$$

where $H_W$ is the magnetic field generated by magnetic domain wall energy in the presence of magnetic domain walls in the region 12 or 13 of the recording layer and applied to the recording layer 1, $H_d$ is a self-demagnetizing field of the recording layer, $H_{ex}$ is the external magnetic field, $H_I$ is the leakage field from the bias layer, and $H_{exg}$ is the exchange force from the bias layer. In this case, since the recording layer 1 and the bias layer are not exchange-coupled, the exchange force $H_{exg}$ need not be taken into consideration. If the effective field $H_{eff}$ satisfies condition $H_C < H_{eff}$, and the direction of magnetization determined on the basis of equation (4) is the recording direction of the recording layer 1, magnetization ($M_S$) of the recording layer 1 is directed to the recording direction. However, when its direction is the erasure direction, $M_S$ is directed to the erasure direction. By forming the heat distribution shown in FIG. 12 and by appropriately setting $H_W$, $H_d$, and $H_{ex}$, the direction of the field $H_{eff}$ of the region 13 at the light beam propagatiion direction side, i.e., the positive directionside in FIG. 12 can be set to be opposite to that of the field $H_{eff}$ of the region 12 at the negative direction side by the $H_I$ effect. In this manner, the heat response characteristics of the medium, the thermo-magnetic characteristics of the medium, and its operating conditions are also defined. In order to effectively achieve the object of preventing incomplete erasure, the $H_{eff}$ direction in the region 13 at the positive direction side is defined as the erasure direction, while the $H_{eff}$ direction in the region 12 at the negative direction side is defined as the recording direction. By these definitions, it is possible to record information in an oppsite side to the moving direction side of the light beam spot while erasure is being performed in the light beam moving direction side during scanning with the light beam spot.

Figure 13:
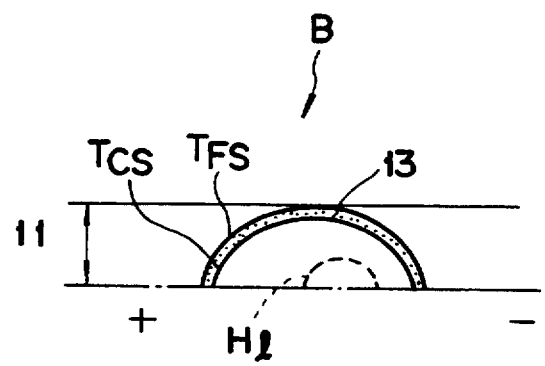
FIG. 13 is a view showing a state of a beam irradiated portion in the erasure mode according to the present invention.

When $P_E$ lower than $P_W$ is radiated on the medium, it is possible to obtain a beam irradiated portion having a heat distribution shown in FIG. 13. By forming this heat distribution, the $H_{eff}$ direction in all the regions between the $T_{CS}$ and $T_{FS}$ curves can be defined as the erasure direction. In this case, the external field Hex is applied as needed. The $H_{ex}$ magnitude in the erasure mode is set to be equal to that in the recording mode, and the $H_{ex}$ direction in the erasure mode is set to be the same as that in the recording mode.

When the overwrite operation is performed as described above, it is possible to accurately erase information left in the $P_W$ irradiated portion and record new information therein. It is also possible to accurately erase information from the $P_E$ irradiated portion. Therefore, incomplete erasure and crosstalk can be accurately prevented.

When an overwrite operation is to be performed in the mode of the "erasure assistance" ($P_E > P_W$) utilizing the above heat distribution, stable tracking can be performed even if a pregroove or wobble pit is not formed. As shown in FIG. 14A, $P_E$ higher than $P_W$ is radiated on a medium having no tracks to obtain an irradiated portion C having the same heat distribution as in FIG. 12. In the same manner as in FIG. 12, a laser beam spot is moved from the right to the left. A region surrounded by the $T_{CS}$ and $T_{FS}$ curves crosses a boundary for determining whether the field $H_I$ is applied or not, and regions 14 and 15 corresponding to the regions 12 and 13 in FIG. 12 are formed. It is therefore possible to set the $H_{eff}$ direction in the region 15 at the positive direction side in FIG. 14A to be opposite to the $H_{eff}$ direction in the region 14 at the negative direction side in FIG. 14A by the $H_I$ effect. The thermal response characteristics of the medium, the thermo-magnetic characteristics of the medium, and its operating conditions are also defined as described above. The $H_{eff}$ direction in the region 15 is defined as the recording direction, while the $H_{eff}$ direction in the region 14 is defined as the erasure direction. By these definitions, erasure can be performed in an opposite side to a light beam spot moving direction side while recording is being performed in the light beam moving direction side during scanning with a light beam spot.

As shown in FIG. 14A, the height of the region 15 in a direction perpendicular to the light beam moving direction is larger than that of the region 14. As shown in FIG. 14B, a band-like inversion region 17 is formed upon movement of the light beam, thereby forming a track 16.

The band-like inversion region 17 can be used as a tracking groove. For example, after a medium film structure is formed on a substrate having no pregroove or wobble pit, the medium is set in a track forming device using a high-precision air spindle motor as a disk rotation motor, the medium is rotated while being continuously irradiated with a light beam having a track forming level or erasure level ($P_E$), and an optical head is fed at a desired pitch (e.g., 1.5 μm) in the radial direction of the disk, thereby forming concentric or spiral tracks 16. When a practical optical disk drive has precision enough to form tracks at a desired pitch, a light beam having the track forming level or $P_E$ level is radiated in the optical disk drive to form tracks. That is, tracks need not be formed in advance. When tracks are formed in a practical optical disk drive, high rotation precision is required during only track formation. Upon formation of tracks, tracking can be achieved, and high rotation precision is not required, resulting in a practical advantage.

An external field $H_{ex}$ having a given direction of magnetization and a given magnitude can be commonly applied during $P_W$ radiation and $P_E$ radiation, and a light beam is set to satisfy condition $P_E > P_W$, thereby performing an overwrite operation. In this case, if a heat distribution during $P_E$ radiation is given as in FIG. 14A, the tracks 16 can be formed with $P_E$ radiation without defining a track forming power level.

When a light beam having the power $P_W$ satisfying condition $P_W < P_E$ is radiated on the medium, it is possible to obtain an irradiated portion D having a heat distribution shown in FIG. 15A. In this case, the $H_{eff}$ direction is defined as the recording direction throughout the region between the $T_{CS}$ and $T_{FS}$ curves. As shown in FIG. 15B, an inversion magnetic domain 18 is formed in a track 16. When overwrite recording is performed from the first recording operation without forming tracks upon radiation of an erasure beam in advance, since the track 16 is not formed during $P_W$ radiation, the track is disconnected around the inversion magnetic domain 18. As proper tracking, however, can be achieved, the track need not be formed in advance. In either case, track formation, recording in FIG. 15A, and erasure in FIG. 14A can be simultaneously performed by controlling a power level, thereby simultaneously performing track formation and an overwrite operation.

A magneto-optical recording medium according to the present invention will be described in detail below.

As described above, according to the present invention, the recording layer 1 and the bias layer 2 are indispensable layers. The nonmagnetic intermediate layer 3 and the reversal preventive layer 4 may be formed as needed.

A practical magneto-optical medium is arranged, as shown in FIG. 16. Reference numeral 7 denotes a substrate made of glass or a transparent resin. An interference layer 5, a recording layer 1, an intermediate layer 3, a bias layer 2, a reversal preventive layer 4, and a protective layer 6 are sequentially stacked on the substrate 7. These layers are preferably formed by a thin-film formation technique such as sputtering.

A recording layer 1 may be formed of material wherein a reversed magnetic domain which can be detected as a signal by utilizing a magneto-optical effect can be formed, and this domain and a reversed magnetic domain can be erased. The bias layer 2 may be made of a material which allows a change in magnetization by a change in temperature. In this case, a field $H_I$ is generated outside the bias layer in accordance with a change in the magnetization state (or spatial magnetization distribution) in the magnetization state. A field $H_I$ upon $P_W$ radiation is different from that upon $P_E$ radiation, and the bias layer itself is not reversed by an overwrite operation. The bias layer 2 preferably has characteristics wherein a degree of modulation of $H_I$ is maximized, i.e., $M_{SB}$ changes slightly from $T_a$ to near $T_{CB}$ and changes abruptly near $T_{CB}$. A preferable composition of the bias layer is a TM-rich composition of an RE-TM film wherein Fe is a major constituent of TM.

Judging from the above viewpoint, both the recording and bias layers 1 and 2 are preferably perpendicular magnetized films each having an axis of easy magnetization in a direction perpendicular to the layer surface. A material for these films is preferably an RE-TM alloy such as TbFe, TbCo, TbFeCo, GdTbFe, GdTbFeCo, and GdTbCo. According to the gist of the present invention, the material is not limited to a specific one. A wide range of materials such as a granet magnetic material, a multilayered film material (e.g., Pt/Co), Heusler alloy and a magnet material can be used if such a material can form a perpendicular magnetized film.

The thickness of the recording layer 1 is not limited to a specific value. However, the thickness of the recording layer 1 is preferably small enough to sufficiently heat the bias layer upon laser beam radiation and not to increase a leakage field of the recording layer, and large enough to cause an appropriate temperature difference between the recording layer 1 and the bias layer 2. From this viewpoint, the thickness of the recording layer preferably falls within the range of 10 nm to 40 nm.

The thickness of the bias layer 2 is preferably large enough to apply a large $H_I$ to the recording layer side and small enough not to cause a large temperature difference in the direction of thickness of the bias layer. The thickness of the bias layer 2 preferably falls within the range of about 100 nm to about 600 nm.

The reversal preventive layer 4 may be formed of material of which Curie point is high enough the magnetization not to be reversed by radiating the laser beam, for example, TbCo, or GdTbCo in a form of a thick film (thickness is for example 40 nm or more). When the layer 4 prevents reversal of the bias layer 2 by mainly the filed $H_{exgI}$, the layer 4 may be thin. When the layer 4 prevents reversal of the bias layer 2 by mainly the field $H_{II}$, the layer 4 is preferably thick. The thickness of the reversal preventive layer 4 is preferably small enough to sufficiently heat the bias layer.

The nonmagnetic intermediate layer 3 is formed to intentionally block an exchange force between the recording layer 1 and the bias layer 2. A material for the nonmagnetic intermediate layer 3 is not limited to a specific one as long as it is nonmagnetic, but is preferably a dielectric material such as Si—N, Si—O and Zr—O. The thickness of the intermediate layer 3 is large enough to block the exchange force between the recording layer and the bias layer and small enough to apply a sufficient $H_I$ to the recording layer. At the same time, the intermediate layer 3 preferably has a thickness enough to cause an appropriate temperature difference between the recording and bias layers. In addition, when the recording layer 1 is thin, the intermediate layer 3 has a thickness enough to effectively enhance a Kerr rotation angle. It is preferable to appropriately determine the thickness of the intermediate layer in association with optical and thermal constants of the intermediate layer.

The interference layer 5 has a function of enhancing the Kerr rotation angle by a multiple interference action upon radiation of a light beam. The interference layer 5 is made of, e.g., a dielectric material such as Si—N. The protective layer 6 is made of, e.g., a dielectric and has a function of protecting the recording layer 1 and the bias layer 2. The interference layer 5 and the protective layer 6 are preferably formed, but are not indispensable layers.

As described above, according to the present invention, as compared with an external field modulation method, a two-sided disk can be easily used, both high-transfer rate and low power consumption can be achieved, and the medium of this embodiment is easily compatible with commercially available magneto-optical disks. As compared with a conventional light power modulation method, the degree of modulation of the internal magnetic field can be larger than a structure using a single recording layer. The thermo-magnetic properties of the medium of the present invention can be more easily controlled than those of a structure using an exchange coupling multilayered medium (a disk using the $H_{exg}$). In addition, both the sensitivity and the erasure power margin can be increased, and the initial field $H_{ini}$ is not required. In addition, a step need not be formed on the medium unlike a conventional medium using the field $H_I$, so that a selection range of materials and compositions can be increased.

EXAMPLES

The present invention will be described in detail by way of its examples.

EXAMPLE 1

In this example, a magneto-optical medium having a structure shown in FIG. 16 was prepared. A 25-nm thick $Tb_{22}(Fe_{0.9}Co_{0.1})_{78}$ layer, a 200-nm thick $Tb_{17}(Fe_{0.95}Co_{0.05})_{83}$ layer, a 5-nm thick Si—N layer, a 200-nm thick $Tb_{24}Co_{76}$ layer, a 100-nm thick Si—N layer, and a 100-nm thick Si—N layer were used as the recording layer 1, the bias layer 2, the intermediate layer 3, the reversal preventive layer 4, the interference layer 5, and the protective layer 6, respectively, and were sequentially formed on the glass substrate 7 in the order shown in FIG. 16.

These layers were formed by a magnetron sputtering method. The substrate 7 and a magnetic characteristic measuring substrate were mounted in a substrate holder, and the holder was placed in a 4-element magnetron sputtering apparatus. The interior of the 4-element magnetron sputtering apparatus was evacuated to $1 \times 10^{-6}$ Torr. A gas pressure inside a film formation chamber was maintained at $5 \times 10^{-3}$ Torr by adjusting a conductance valve of an evacuation system while a 10% $N_2$/Ar gas mixture was being supplied to the chamber at a rate of 70 sccm. In this state, the substrate holder was rotated at 60 rpm, and an RF power of 500 W was applied to an $Si_3N_4$ target. Target conditioning was performed for 5 minutes while a shutter located above the target was kept closed.

The shutter was then opened, and sputtering was performed for 28 minutes to form the interference layer 5 on the substrate 7. After this layer was formed, gas supply was temporarily stopped, and the internal pressure of the film formation chamber was evacuated to $1 \times 10^{-6}$ Torr. 5N grade Ar gas was supplied to the film formation chamber at a flow rate of 70 sccm to set an internal gas pressure to $5 \times 10^{-3}$ Torr. An RF power of 300 W was applied to the substrate holder to clean the surface of the interference layer for 5 minutes.

A power was applied to a Tb target, an Fe target, and a Co target so that a film to be formed would have a predetermined composition ratio, and presputtering was performed for 5 minutes with the shutter being closed. The shutter was then opened to form the recording layer 1 for 40 seconds. The internal gas was substituted with the 10% $N_2$-Ar gas, and the intermediate layer 3 was formed for about 4 minutes by using the $Si_3N_4$ target. The gas was then substituted with an Ar gas, and the surface of the intermediate layer was cleaned as described above. A power was supplied to the Tb, Fe, and Co targets so that a layer to be formed would have a desired composition, and the bias layer 2 was formed for 5 minutes upon completion of presputtering. Subsequently, a power was supplied to the Tb and Co targets to obtain a predetermined composition ratio and to form the reversal preventive layer 4 for about four minutes. The gas inside the chamber was substituted with 10% $N_2$-Ar gas. The protective film 6 was formed for 25 minutes by using the $Si_3N_4$ target. Rotation of the substrate holder was stopped, and the substrate 7 was removed from the film formation chamber, thereby obtaining the magneto-optical medium (FIG. 16) by the series of above operations.

Initial magnetization of the above medium was performed by passing a magnet at room temperature. More specifically, a magnetic field $H_{INI}1$ was applied to the medium downward, and a magnetic field $H_{INI}2$ having a larger magnitude than the reversal field of the reversal preventive layer but a smaller magnitude than the magnetic field $H_{INI}1$ was applied to the medium upward, so that the directions of initial magnetization of the recording layer 1 and the bias layer 2 were set to be downward, and the direction of initial magnetization of the reversal preventive layer 4 was set to be upward.

If a measurement substrate is mounted together with the disk substrate 7 in the substrate holder, $M_{SS}$, $M_{SB}$, $H_{CS}$, and $H_{CB}$ can be measured by for example VSM. If it is difficult to measure these values in the same measurement range because the recording layer 1 is thinner than the bias layer 2, an arbitrary measurement can be performed by forming only the recording or bias layer under the same sputtering conditions.

FIG. 17 is a graph showing $M_{SB}(T)$ characteristics of a $Tb_{17}(Fe_{0.95}Co_{0.05})_{83}$ bias layer 2 (thickness: 200 nm) obtained by a VSM measurement, and a relationship between temperature T and a leakage field $H_I$ at a heating center position obtained when the bias layer having the $M_{SB}(T)$ characteristics has a Gaussian heat distribution having a full-width at half maximum of 0.8 μm. FIG. 18 is a graph showing a relationship between temperature T at a heating center position which is obtained on the basis of $M_{SI}(T)$ characteristics of a 200-nm $Tb_{24}Co_{76}$ reversal preventive layer 4 and a Gaussian heat distribution having a full-width at half maximum of 0.8 μm, and a leakage field of the reversal preventive layer. In FIGS. 17 and 18, $H_I$ values detected at the recording layer are plotted. The T characteristics of the coercive force $H_{CS}$ of the recording layer are shown in FIG. 11A, and $T_{CS}$ is 260° C., which is higher than $T_{CB}$ (220° C.). $T_R$ is changed as a function of $H_{eff}$. Since $H_{CS}$ is about 200 Oe at 220° C., the temperature $T_R$ generally falls within the range of 220° C. to 260° C. Abovementioned FIG. 5 is a view showing time changes (corresponding to the spatial distribution in the track direction) in $T_S$ and $T_B$ when a light beam having a Gaussian distribution having a full-width at half maximum of 0.8 μm is scanned on the medium of FIG. 16 at a linear velocity of 6.6 m/s. FIG. 5 shows a result obtained by a thermodynamic equation solved by 3rd-order numerical analysis. A temperature rise rate per 1 mW is plotted along the ordinate.

From FIGS. 5, 6A to 6C, 17, and 18, a degree of modulation of $H_I$ when the medium of FIG. 16 is moved relative to the laser beam spot at a predetermined linear velocity and a laser beam power-modulated to $P_W$ and $P_E$ ($P_W > P_E$) is irradiatied are obtained. For example, if a linear velocity of the laser beam spot was given as 6.6 m/s, $P_W = 10$ mW, and $P_E = 6$ mW, then $T_S$ was a maximum of about 400° C. and $T_B$ was a maximum of about 300° C. Therefore, these temperatures were confirmed to be sufficiently higher than $T_{CS}$ and $T_{CR}$, respectively.

When the medium is cooled and $T_S$ reaches $T_R$, substantially $T_S = T_B$, as is apparent from FIG. 5. More specifically, as is apparent from FIG. 17, during $P_W$ radiation, the field $H_I$ of 600 to 700 Oe is applied from the bias layer 2 to the recording layer 1 in the recording direction under the condition of $T_S = T_R$. As is apparent from FIG. 18, the field H, of 280 to 300 Oe is applied from the reversal preventive layer 4 to the recording layer 1 in the erasure direction under the same conditions. On the other hand, during $P_E$ radiation, $T_B$ is about 180° C. for substantially $T_S = T_R$. As is apparent from FIG. 17, the field $H_I$ of about 250 Oe is applied from the bias layer to the recording layer in the recording direction. As is apparent from FIG. 18, the field $H_I$ of about 250 Oe is applied from the reversal preventive layer to the recording layer in the erasure direction. That is, a degree of $H_I$ modulation by power modulation between $P_W$ and $P_E$ is of 320 to 400 Oe. If the terms ($H_{exg}$ need not be taken into consideration from the beginning) except for $H_I$ in equation (3) are set not to largely depend on $P_W$ and $P_E$ and to fall within the range of 160 to 200 Oe in the erasure direction, the $H_{eff}$ value falls within the range of 160 to 200 Oe in the recording direction upon $P_W$ radiation and falls within the range Of 160 to 200 Oe in the erasure direction upon $P_E$ radiation. Therefore, sufficient fields $H_{eff}$ can be applied in both $P_W$ radiation and $P_E$ radiation.

In order to verify an overwrite operation, an overwrite test was repeated at recording frequencies of 1 MHz and 1.5 MHz under the following conditions: a linear velocity of 6.6 m/s; $P_W = 10$ mW; $P_E = 6.5$ mW; $P_R = 0.5$ mW; $H_{ex} = 0$ Oe; and a recording pulse width of 160 nS. As a result, a 1-MHz reproduction signal waveform and a 1.5-MHz reproduction signal waveform could be repeatedly rewritten, thereby proving the validity of the present invention. In addition, preliminarily, of media of this example, a sample having no recording layer 1 was prepared, and the overwrite test was performed. It was confirmed that the direction of magnetization of the bias layer was not inverted in this sample.

In this example, the direction of initial magnetization was selected so that the field $H_I$ was applied in the recording direction. However, if the directions of initial magnetization of the bias layer and the reversal preventive layer are selected to be opposite to the direction of initial magnetization of the recording layer, an overwrite operation can be performed by resetting an external field $H_{ex}$. In this case, the field $H_I$ is applied in the erasure direction.

EXAMPLE 2

Identical layers to those in Example 1 were used as a substrate, an interference layer, a recording layer, an intermediate layer, and a protective layer, a 400-nm thick $Tb_{24}Co_{76}$ layer was used as a bias layer, and no reversal preventive layer was formed. The directions of initial magnetization of the recording layer 1 and the bias layer 2 were set to be downward.

In this example, a degree of $H_I$ modulation was obtained from FIG. 18. Unlike Example 1, the $Tb_{24}Co_{76}$ film as the bias layer was located near the recording layer and had a thickness twice that of the biasing layer in the Example 1. In this case, an $H_I$ value was three or four times that in FIG. 18. If $P_W = 10$ mW and $P_E = 6$ mW (linear velocity: 6.6 m/s), the field $H_I$ was modulated by 100 to 200 Oe accordingly. In this example, since a bias layer in which $M_{SB}$ changed moderately as a function of T was used, the degree of $H_I$ modulation was smaller than that in Example 1, but an overwrite operation could be performed in this case too. Note that since the degree of $H_I$ modulation was smaller that that of Example 1, a reproduction signal intensity was smaller than that in Example 1.

EXAMPLE 3

Using a medium identical to that of Example 1, the directions of initial magnetization of a recording layer 1 and a reversal preventive layer 4 were set to be downward, and the direction of initial magnetization of a bias layer 2 was set to be upward. If a linear velocity of a laser beam of 6.6 m/s, $P_W = =6$ mw, and $P_E = 10$ mW are given, then Ts is a maximum of about 400° C. and $T_B$ is a maximum of about 300° C. upon $P_E$ radiation, and these temperatures are sufficiently higher than $T_{CS}$ and $T_{CR}$, as is apparent from FIGS. 5, 11A to 11C, 17, and 18.

As in Example 1, when the medium is cooled and Ts reaches $T_R$, substantially $T_S = T_B$. During $P_E$ radiation, the field $H_I$ of 600 to 700 Oe is applied from the bias layer 2 to the recording layer 1 in the erasure direction under the condition of substantially $T_S = T_R$, as is apparent from FIG. 17. Similarly, as is apparent from FIG. 18, the field $H_I$ of 280 to 300 Oe is applied from the reversal preventive layer 4 to the recording layer 1 in the recording direction under the same condition. On the other hand, during $P_W$ radiation, $T_B$ is about 180° C. for substantially $T_S = T_R$. As is apparent from FIG. 17, the field $H_I$ of about 250 Oe is applied from the bias layer to the recording layer in the recording direction. As is apparent from FIG. 18, the field $H_I$ of about 250 Oe is applied from the reversal preventive layer to the recording layer in the erasure direction. That is, a degree of $H_I$ modulation by power modulation between $P_W$ and $P_E$ is 320 to 400 Oe. If the terms except for $H_I$ in equation (3) are determined not to largely depend on $P_W$ and $P_E$, and are set to fall within the range of 160 to 200 Oe in the recording direction, the field $H_{eff}$ value falls within the range of 160 Oe to 200 Oe in the recording direction upon $P_W$ radiation and falls within the range of 160 to 200 Oe in the erasure direction upon $P_E$ radiation. Therefore, the sufficient fields $H_{eff}$ can be applied during both $P_W$ radiation and $P_E$ radiation.

In order to verify an overwrite operation, an overwrite test was repeated at recording frequencies of 1 MHz and 1.5 MHz under the following conditions: a linear velocity of 6.6 m/s; $P_W = 6.5$ mW; $P_E = 10$ mW; $P_R = 0.5$ mW; $H_I = 0$ Oe; and a recording pulse width of 160 nS. As a result, a 1-MHz reproduction signal waveform and a 1.5-MHz reproduction signal waveform could be repeatedly rewritten, thereby proving the validity of the present invention. In addition, preliminarily, of media of this example, a sample having no recording layer 1 was prepared, and the overwrite test was performed. It was confirmed that the direction of magnetization of the bias layer was not inverted in this sample.

In this example, the direction of initial magnetization was selected so that the field $H_I$ was applied in the erasure direction. However, if the directions of initial magnetization of the bias layer and the reversal preventive layer are selected to be opposite to the direction of initial magnetization of the recording layer, an overwrite operation can be performed by resetting an external field $H_{ex}$. In this case, the field $H_I$ is applied in the recording direction.

EXAMPLE 4

Using a medium identical to that in Example 2, the direction of initial magnetization of a recording layer 1 was set to be downward, and the direction of initial magnetization of a bias layer 2 was set to be upward.

When $P_W=10$ mW and $P_E=6$ mW (linear velocity: 6.6 m/s), then a field $H_I$ was modulated by 100 to 200 Oe as in Example 2, and an overwrite operation could be performed. However, a degree of $H_I$ modulation was smaller than that in Example 3, and its reproduction signal intensity was lower than that of Example 3.

EXAMPLE 5

A 25-nm thick TbFeCo layer, a 200-nm thick TbFeCo layer, a 5-nm $Si_3N_4$ layer, a 200-nm thick TbCo layer, and a 100-nm thick $Si_3N_4$ layer were used as a recording 1, a bias layer 2, an intermediate layer 3, an inversion preventive layer 4, and an interference layer 5, respectively. These layers were stacked on a 1.2-mm thick glass substrate 7.

These layers were formed by a magnetron sputtering method following the same procedures as in Example 1.

The directions of initial magnetization of the recording layer 1 and the bias layer 2 were set to be downward, and the direction of initial magnetization of the inversion preventive layer 4 was set to be upward.

Figure 19:
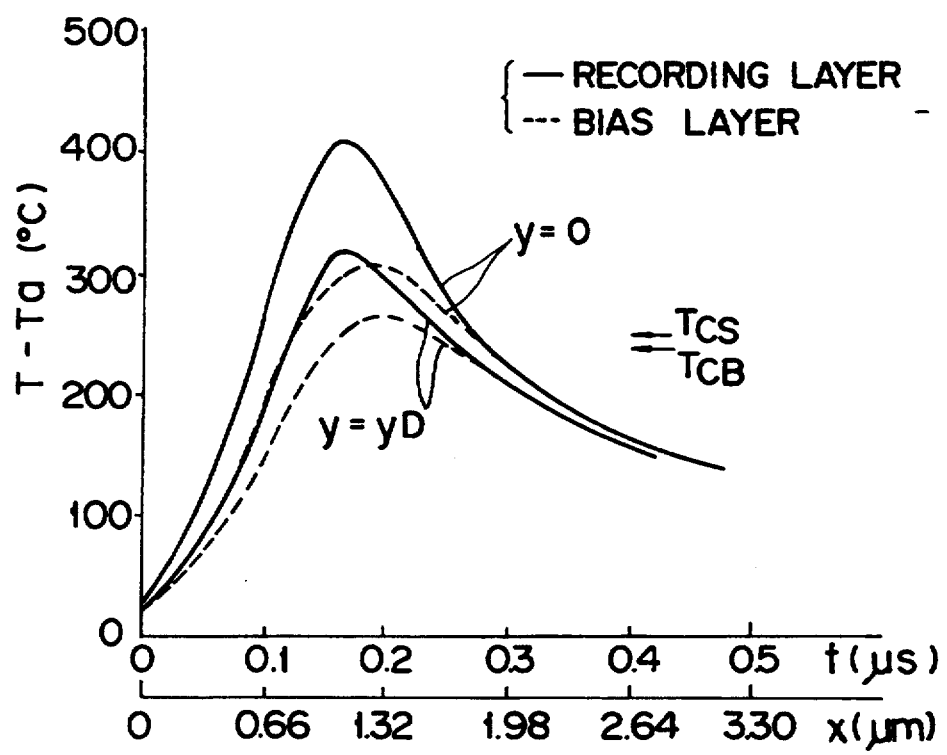
FIG. 19 is a graph showing heat response of recording and bias layers upon radiation of a high-power laser beam in another example of the medium shown in FIG. 16.
Figure 19:
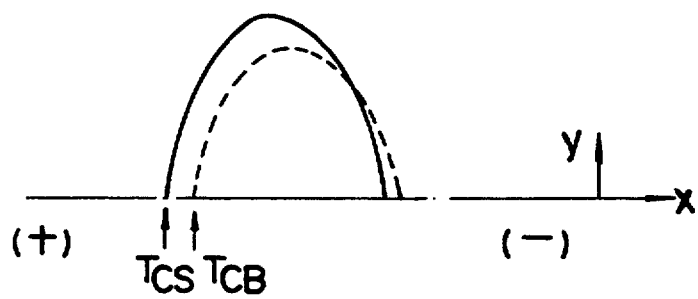
Figure 20:
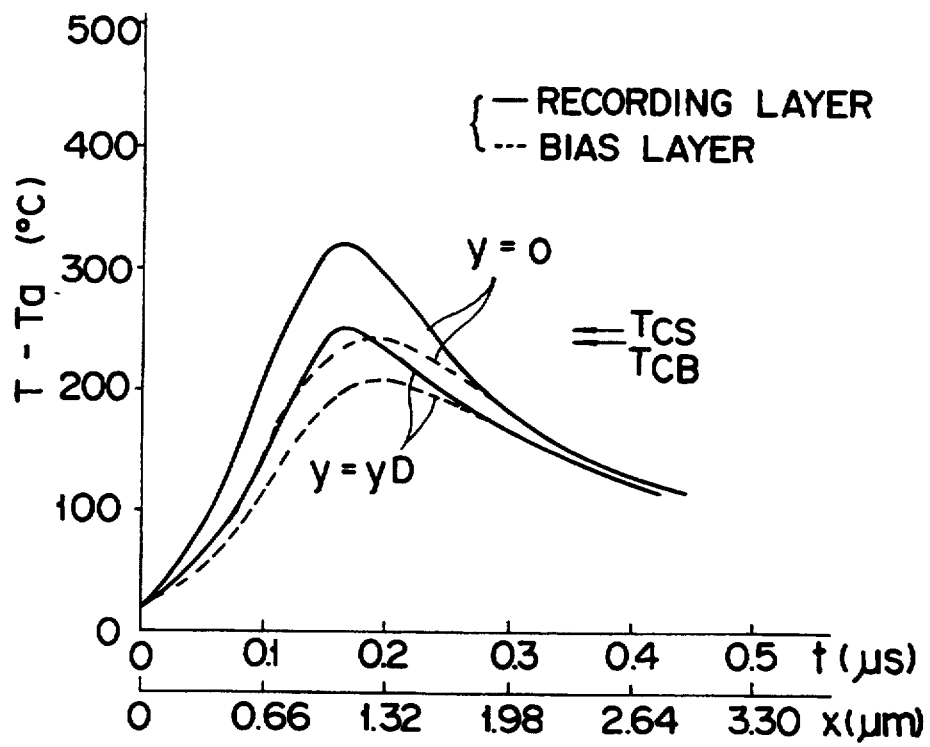
FIG. 20 is a graph showing heat response characteristics of recording and bias layers upon radiation of a low-power laser beam in another example of the medium shown in FIG. 16.
Figure 20:
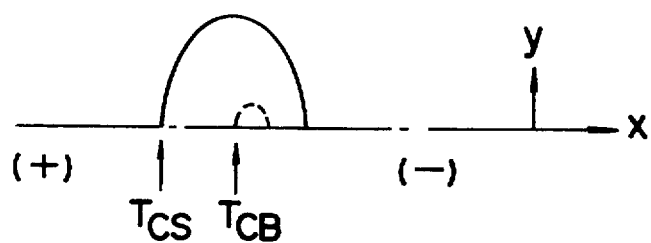

A laser beam was radiated on the medium having the above state from the substrate 7 side under the conditions: a laser beam moving speed of 6.6 m/s; $P_W=10$ mW; and $P_E=7.8$ mW. Heat response characteristics (or spatial distributions in the track direction) of the recording and bias layers 1 and 2 upon $P_W$ radiation and $P_E$ radiation are shown in FIGS. 19, and 20, respectively. The laser beam spot is moved from the right to the left with respect to the medium. The left direction is defined as a positive direction, while the right direction is defined as a negative direction. FIGS. 19 and 20 show heat response characteristics at an arbitrary position x in the track direction or heat distributions in the track direction at a given time with respect to a track center position $y=0$ and a track edge position $y=y_D$ ($y_D=0.3375$ μm) upon continuous radiation of the laser beam. In practice, a heat distribution at the leading edge of a pulse (because a recording laser beam is a laser beam pulse in practice) is different from that in FIG. 19. However, an essential difference is not caused by a difference between continuous radiation and pulsed radiation in order to explain the present invention. As described above, the bias layer 2 generates a large field $H_I$ at $T_{CB}$ or more and generates almost no field $H_I$ at temperatures less than $T_{CB}$. The $T_{CB}$ curve of the bias layer 2 is used as a substitute of a boundary of the $H_I$ intensity in FIG. 12. Therefore, it is considered that a large $H_I$ acts inside the $T_{CB}$ curve but almost no $H_I$ acts outside the $T_{CB}$ curve. When the directions of initial magnetization are set as described above, the field $H_I$ acts upward. When a composition having no compensation point at room temperature or more is selected for the recording layer 1, the field $H_I$ is generated in the recording layer in the recording direction.

FIGS. 19 and 20 do not show the $T_{FR}$ curve shown in FIG. 12. However, the $T_{FR}$ curve is determined by the following condition:

$$H_{CS}=H_{eff}$$

that is, the $T_{FS}$ curve is a function of $H_W$, $H_d$, and $H_{ex}$. The $T_{FS}$ curve is located slightly outside the $T_{CS}$ curves in FIGS. 19 and 20. As shown in FIG. 19, a region between the $T_{CS}$ and $T_{FS}$ curves located on the positive direction side of the recording layer is located outside the $T_{CB}$ curve and is located inside the $T_{CB}$ curve on the negative direction side. By controlling $H_W$, $H_d$, and $H_{ex}$, the direction of the field $H_{eff}$ can be directed in the erasure direction (downward) on the positive directions side, and in the recording direction (upward) on the negative direction side. As shown in FIG. 20, during $P_E$ radiation, the direction of the field $H_{eff}$ was confirmed to be directed in the erasure direction throughout the region between the $T_{CS}$ and $T_{FS}$ curves without changing the field $H_{ex}$ in the recording mode.

EXAMPLE 6

A medium identical to that in Example 5 was prepared. The directions of initial magnetization of a recording layer 2 and a reversal preventive layer 4 were set to be downward, and the direction of initial magnetization of a bias layer 2 was set to be upward.

A laser beam was radiated on the medium having the above state from the substrate 7 side under the conditions: a laser beam moving speed of 6.6 m/s; $P_W=7.8$ mW; and $P_E=10$ mW. Heat response characteristics of the recording and bias layers 1 and 2 upon $P_W$ radiation and $P_E$ radiation are shown in FIGS. 20 and 19, respectively, unlike in Example 5. As described above, the bias layer 2 generates a large field $H_I$ at $T_{CB}$ or more and generates almost no field $H_I$ at temperatures less than $T_{CB}$. The $T_{CB}$ curve of the bias layer 2 is used as a substitute of a boundary of the $H_I$ intensity in FIG. 12. Therefore, it is considered that a large $H_I$ acts inside the $T_{CB}$ curve but almost no $H_I$ acts outside the $T_{CB}$ curve. When the directions of initial magnetization are set as described above, the field $H_I$ acts downward. When a composition having no compensation point at room temperature or more is selected for the recording layer 1, the field $H_I$ is generated in the recording layer in the recording direction. The $T_{FS}$ curve is located slightly outside the $T_{CS}$ curve in FIGS. 19 and 20 as in Example 5. As shown in FIG. 19, a region between the $T_{CS}$ and $T_{FS}$ curves located on the positive side of the recording layer is located outside the $T_{CB}$ curve and is located inside the $T_{CB}$ curve on the negative side. By controlling $H_W$, $H_d$, and $H_{ex}$, the direction of the field $H_{eff}$ can be directed in the erasure direction (downward) on the positive side, and in the recording direction (upward) on the negative side. As shown in FIG. 20, during $P_E$ radiation, the direction of the field $H_{eff}$ was confirmed to be directed in the erasure direction throughout the region between the $T_{CS}$ and $T_{FS}$ curves without changing the field $H_{ex}$ in the recording mode.

In this example, the recording layer does not have a compensation point ($T_{comps}$) higher than $T_a$ and has $T_{CS}$ within the range of temperatures obtained upon $P_W$ or $P_E$ radiation. The recording layer may have $T_{comps}$ higher than $T_a$. In this case, since the direction of initial magnetization of the recording layer coincides with the recording direction, the direction of initial magnetization can be properly determined. The recording layer may be made of a material such as GdTbCo or TbCo in which $T_{CS}$ is higher than $T_S$ obtained by radiation of the $P_W$ or $P_E$ level. The thickness of the intermediate layer is appropriately determined in association with the optical and thermal constants.

A material for the bias layer is preferably an RE-TM film having Fe as a major constituent of TM of a TM-rich composition, e.g., $Tb_{17}(Fe_{0.95}Co_{0.05})_{83}$ used in Example 1 so as to obtain a maximum degree of $H_I$ modulation as in Example 1, i.e., so as to obtain characteristics wherein a change in $M_{SB}$ is small from $T_a$ to about $T_{CB}$ and is abrupt near $T_{CB}$.

The bias layer described with reference to Example 2 need not be made of an RE-TM film having a TM-rich composition having Fe as a major constituent of TM because the field $H_I$ can be modulated with a power. In this case, the bias layer may be an RE-TM film having an Re-rich composition having Fe as a major constituent of TM. In this case, a compensation point ($T_{compB}$) need not fall within the range of $T_a$ to $T_{CB}$ (a composition having no $T_{compB}$ is preferable to obtain a larger degree of $H_I$ modulation). As in Example 2, a bias layer having Co as a major constituent of TM may be used. In this case, $T_{compB}$ may be present or absent. The direction of initial magnetization of the bias layer can be set to properly coincide with the direction of initial magnetization of the recording layer so as to apply the field $H_I$, in the recording or erasure direction of the recording layer.

The optimal thicknesses of the recording layer 1 and the bias layer 2 vary depending on material systems. For example, in a bias layer serving as a perpendicular magnetized film having $M_{SB}(T_a)$ of 400 emu/cc, the film thickness can be ½ that of the bias layer consisting of an RE-TM film so as to obtain the same field $H_I$.

In order to set the direction of initial magnetization of a recording layer to be opposite to that of a bias layer, a medium is held at a temperature corresponding to different $H_{CS}$ and $H_{CB}$ values. Of the magnetic fields having $H_{CS}$ and $H_{CB}$, a magnetic field having a larger value is used to align the direction of magnetization of each layer, and then a magnetic field having an intermediate value between $H_{CS}$ and $H_{CB}$ is used to reverse the direction of the layer having a smaller one of the $H_{CS}$ and $H_{CB}$ values. If $H_{CS}$ and $H_{CB}$ values are different at $T_a$, no temperature control is required to obtain opposite directions of initial magnetization. Even a bias layer which is not inverted by an overwrite operation can be initialized by a high-power laser such as an He-Ne laser or Ar laser which is not built into a practical optical disk drive. In addition, even if a semiconductor laser is used and if a laser output has a sufficient margin, an initialization power level may be set higher than $P_W$, or the initialization disk speed may be reduced, thereby initializing the medium in a practical disk drive. When a reversal preventive layer is present, the direction of initial magnetization of the reversal preventive layer may be set as described above.

The disk speed, recording position, recording pulse radiation time, and recording duty ratio in an overwrite operation are not limited to any specific values. When $H_{ex}$, $P_W$, $P_E$ and $P_R$ are set in accordance with application conditions, a good overwrite operation can be performed. These pieces of information can be written in, e.g., a lead-in area, as needed, to realize compatibility between disks having different characteristics and to allow wide selection of operating conditions for one disk. In addition, a light beam modulation system is not limited to a specific one. A $P_W$ pulse may be superposed on $P_E$ to perform an overwrite operation or $V_E$ may be subtracted from $P_W$ to perform an overwrite operation. If an overwrite operation is not required, $P_W$ can be superposed on $P_R$ as in a conventional magneto-optical disk. When a flash erase operation is to be performed, the $P_E$ light may be continuously radiated, or a large external field $H_{ex}$ may be applied in the erasure direction (nonoverwritable $H_{ex}$) and the $P_W$ light may be radiated. The medium according to the present invention can also serve as a conventional magneto-optical disk. Compatibility with conventional magneto-optical disks can be easily established when operating conditions are changed. For example, these operating conditions may be written in, e.g., a lead-in area.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magneto-optical recording system, comprising:
   a magneto-optical medium including a recording layer for magneto-optically recording information and a bias layer magnetostatically coupled to the recording layer wherein said medium further comprises a reversal preventive layer for preventing magnetization reversal of said bias layer;
   means for radiating a light beam of a recording power level onto a portion of said medium including a portion of said recording layer and a portion of said bias layer to heat said portion of said recording layer and said portion of said bias layer wherein the value of said recording power level is selected so that said portion of the recording layer is heated to a first magnetization reversal temperature and so that said heating causes a direction of magnetization of said portion of said recording layer irradiated with said light beam to be aligned with a direction of a first leakage field generated from said bias layer based on a magnetic distribution formed in said bias layer by said irradiation with said light beam of said recording power level on said portion of said bias layer, and which thereby causes said portion of said recording layer irradiated with said light beam having said recorded power level to be in an information recorded state;
   means for irradiating a light beam of an erasure power level onto a portion of said medium including a portion of said recording layer and a portion of said bias layer to heat said recording layer portion and said bias layer portion wherein the value of said erasure power level is selected so that said portion of said recording layer is heated to a second magnetization reversal temperature and so that said portion of said bias layer generates a second leakage field as a function of a magnetic distribution formed in said bias layer due to irradiation of said portion of said bias layer with said light beam of said erasure power level, a magnitude of said second leakage field being different from that of said first leakage field and wherein the direction of magnetization of said portion of said recording layer irradiated with said light beam having an erasure power level is directed so that said direction is opposite to that of said first leakage field, thereby causing said portion of said recording layer irradiated with said light beam having said erasure power level to be in an information erased state, wherein magnetization directions of said bias layer are the same before and after the radiation of the light beam of the recording power level and before and after the radiation of the light beam of the erasure power level, and a magnetization direction of said bias layer is not reversed by a leakage field generated from said recording layer.

2. A system according to claim 1, wherein said medium further comprises an intermediate layer, formed between said recording layer and said bias layer, for eliminating an exchange force acting between said recording layer and said bias layer.

3. A medium according to claim 1, wherein said reversal preventive layer is exchange-coupled with said bias layer.

4. A magneto-optical recording system comprising:
a magneto-optical medium including a recording layer for magneto-optically recording information and a bias layer magnetostatically coupled to the recording layer wherein said medium further comprises a reversal preventive layer for preventing magnetization reversal of said bias layer;
means for radiating a light beam of erasure power level onto a portion of said medium and including a portion of said recording layer and a portion of said bias layer wherein the value of said erasure power level is selected so that said portion of said recording layer is heated to a first magnetization reversal temperature and so that a direction of magnetization of said portion of said recording level irradiated with said light beam having said erasure power level is aligned with a direction of a first leakage field generated from said bias level based on a magnetic distribution formed in said bias level resulting from said irradiation of said portion of said bias level by said light beam of said erasure power level to thereby cause said portion of said recording level irradiated with said light beam having said erasure power level to be in an information erased state;
means for radiating a light beam at a recording power level onto a portion of said medium including a portion of said recording layer and a portion of said bias layer wherein the value of said recording power level is selected so that said portion of said recording layer is heated to a second magnetization reversal temperature and whereby said portion of said bias layer irradiated with said beam at said recording power level generates a second leakage field based on a magnetic distribution formed in said bias layer due to said irradiation with said light beam of said recording power level with a magnitude of said second leakage field being different from that of said first leakage field and wherein said portion of said recording layer irradiated with said light beam having said recording power level has a direction of magnetization opposite to the direction of said first leakage field thereby causing said portion of said recording layer irradiated with said light beam having a recording power level to be in an information recorded state,
wherein magnetization directions of said bias layer are the same before and after the irradiation of the light beam of the erasure power level and before and after the irradiation of the light beam of the recording power level, and a magnetization direction of said bias layer is not reversed by a leakage field generated from said recording layer.

5. A system according to claim 4, wherein said medium further comprises an intermediate layer, formed between said recording layer and said bias layer, for eliminating an exchange force acting between said recording layer and said bias layer.

6. A system according to claim 4, wherein said reversal preventive layer is exchange-coupled with said bias layer.

* * * * *